US012775472B1

(12) United States Patent
Papratilov et al.

(10) Patent No.: US 12,775,472 B1
(45) Date of Patent: Oct. 27, 2026

(54) GRAPH-BASED STORAGE CONFIGURATION OPTIMIZATION FOR SCALING NODE-ATTACHED STORAGE

(71) Applicant: CAST AI Group, Inc., Miami, FL (US)

(72) Inventors: Ivaylo Papratilov, Sofia (BG); Ciprian Focsaneanu, Bucharest (RO); Jakub Solecki, Cracow (PL)

(73) Assignee: CAST AI Group, Inc., Miami, FL (US)

( * ) Notice: Subject to any disclaimer, the term of this patent is extended or adjusted under 35 U.S.C. 154(b) by 0 days.

(21) Appl. No.: 19/565,323

(22) Filed: Mar. 12, 2026

Related U.S. Application Data

(60) Provisional application No. 63/928,067, filed on Dec. 1, 2025, provisional application No. 63/917,422, filed on Nov. 14, 2025.

(51) Int. Cl.
*G06F 9/44* (2018.01)
*G06F 9/445* (2018.01)

(52) U.S. Cl.
CPC ................................ *G06F 9/44505* (2013.01)

(58) Field of Classification Search
None
See application file for complete search history.

(56) References Cited

U.S. PATENT DOCUMENTS 9,563,687 B1 * 2/2017 Dutta .................... G06F 16/217
11,386,115 B1 * 7/2022 Raghavan ............. G06F 3/0653
11,595,306 B2 2/2023 Masnauskas et al.
12,585,470 B1 * 3/2026 Fontaine ............... G06F 9/3838
2011/0238672 A1 * 9/2011 Agarwala ........... H04L 67/1097 707/E17.014
2012/0060142 A1 * 3/2012 Fliess .................. G06F 11/3457 717/102
2015/0281352 A1 * 10/2015 Nakatsugawa ..... H04L 67/1097 709/217
2017/0262551 A1 * 9/2017 Cho .................... G06F 16/2471
2021/0133151 A1 * 5/2021 Keshtkarjahromi ......................... G06F 16/90335
2023/0080046 A1 3/2023 Paul et al.
(Continued)

*Primary Examiner* — Danny Chan
(74) *Attorney, Agent, or Firm* — Fenwick & West LLP

(57) ABSTRACT

A system performs real-time storage configuration optimization in a container orchestration platform. A current storage state of a worker node, including parameters such as capacity, disk type, number of disks, provisioned IOPS, throughput, and modification history, is received. A solution space graph is generated, with vertices representing feasible storage configurations and edges representing valid provisioning actions. The graph is filtered according to capacity and performance requirements, cloud-provider limits, and modification cooldown restrictions. A search, such as a greedy traversal is performed to select the lowest-cost configuration meeting all constraints. A provisioning plan is created to transition the node from its current configuration to the selected one, including operations such as resizing existing storage, attaching or detaching disks, or adjusting IOPS/throughput. The plan is executed via cloud service provider APIs and operating system or filesystem commands, enabling seamless, cost-efficient, and constraint-aware storage scaling without service disruption.

20 Claims, 7 Drawing Sheets

(56) References Cited

U.S. PATENT DOCUMENTS

| | | | |
|---|---|---|---|
| 2023/0259275 | A1 | 8/2023 | Meister et al. |
| 2023/0409215 | A1* | 12/2023 | Kohli .................. G06F 11/0793 |
| 2024/0314088 | A1 | 9/2024 | Lee et al. |
| 2025/0111204 | A1* | 4/2025 | Eggert ................ G06F 16/3347 |
| 2025/0146827 | A1* | 5/2025 | Manning .............. G01C 21/343 |
| 2025/0278360 | A1 | 9/2025 | Vaideeswaran et al. |
| 2025/0291504 | A1 | 9/2025 | Sundararajan et al. |
| 2025/0307091 | A1 | 10/2025 | Grunwald et al. |

* cited by examiner

600

GRAPH-BASED STORAGE CONFIGURATION OPTIMIZATION FOR SCALING NODE-ATTACHED STORAGE

CROSS-REFERENCE TO RELATED APPLICATIONS

This application claims the benefit of U.S. Provisional Application No. 63/917,422, filed Nov. 14, 2025, and U.S. Provisional Application No. 63/928,067, filed Dec. 1, 2025, each of which is incorporated by reference in its entirety.

TECHNICAL FIELD

This disclosure relates generally to cloud computing, and more specifically autoscaling of node storage and managing storage configurations of worker nodes for container orchestration platforms such as Kubernetes.

BACKGROUND

Cloud-based container orchestration platforms, such as Kubernetes provide node-attached storage that is local storage of individual worker nodes. The node-attached storage stores data such as operating system files, container runtime data, ephemeral storage, projected volumes, image layers, writable container layers, and transient or log data needed by running workloads. Such node-attached storage suffers from significant rigidity and inefficiency. The size and type of node-attached storage is typically specified by the cloud service provider and is difficult to change. If additional space or different storage performance characteristics are required from the node-attached storage, conventional techniques typically create a new node with the desired configuration, migrate workloads to it, and terminate the old node. Even if a cloud service provider allows boot disk modification through their APIs, such changes need to be applied manually, requiring filesystem resizing operations that are complex and result in downtime. Furthermore, if high-demand spikes occur on certain nodes, the container orchestration platform may forcibly evict pods if ephemeral storage usage exceeds a default threshold. This results in disruption of active jobs, loss of intermediate computation state or cached data, and degradation of performance for workloads like CI/CD (continuous integration/continuous delivery) pipelines or machine learning training. As a result, most administrators substantially over-provision storage while using only a fraction of it resulting in wasted cloud costs and inefficient resource utilization.

SUMMARY

The system according to various embodiments, dynamically autoscales node-attached storage for worker nodes in a container orchestration platform by first receiving node-level storage metrics from a given worker node. These metrics may include information such as current capacity utilization, provisioned performance characteristics, and observed I/O activity. The system adds the received storage metrics to a historical storage usage dataset maintained for that worker node, thereby building a time-series record of storage behavior over time. Using both the current metrics and the accumulated historical data, the system determines whether the node-attached storage requires scaling by applying an adaptive threshold function specific to that worker node. This determination is performed proactively, and anticipates a potential eviction event so that node storage is scaled prior to any anticipated eviction event initiated by the container orchestration platform. As a result, scaling actions are triggered before workloads are disrupted and the eviction event is prevented from occurring. When the system determines that scaling is required, a target storage configuration is selected for the worker node. The target storage configuration specifies the desired capacity, performance parameters, and device composition. The system orchestrates execution of the target configuration by invoking application programming interface (API) calls to the underlying cloud or storage management layer, causing the worker node to execute filesystem management commands that integrate the modified or newly attached block devices into the active storage pool without downtime.

According to an embodiment, the system optimizes storage configurations for worker nodes by dynamically analyzing and reconfiguring node-attached storage in a cost-efficient manner. The system receives the current storage state of a worker node, including parameters such as provisioned capacity and throughput. Using this data, it generates a solution space graph in which each vertex represents a feasible storage configuration that meets functional requirements, and each edge corresponds to one or more valid provisioning actions, such as resizing a disk, adding new devices, or detaching existing ones. The system then performs a graph search to evaluate and identify the lowest-cost configuration that satisfies required capacity and performance constraints. Based on the selected configuration, a provisioning plan is generated that specifies the precise sequence of actions to transition the node from its current state, which can include modifying existing device capacity, attaching additional storage devices, or detaching surplus devices. Finally, the system executes the provisioning plan in real time via cloud service provider APIs and operating system commands, effecting the optimized configuration without service interruption.

Embodiments include computer-implemented methods described herein, non-transitory computer readable storage media storing instructions for performing steps of the methods disclosed herein, and systems comprising one or more computer processors and computer readable non-transitory storage medium to perform steps of the computer-implemented methods disclosed herein

Figure 1:
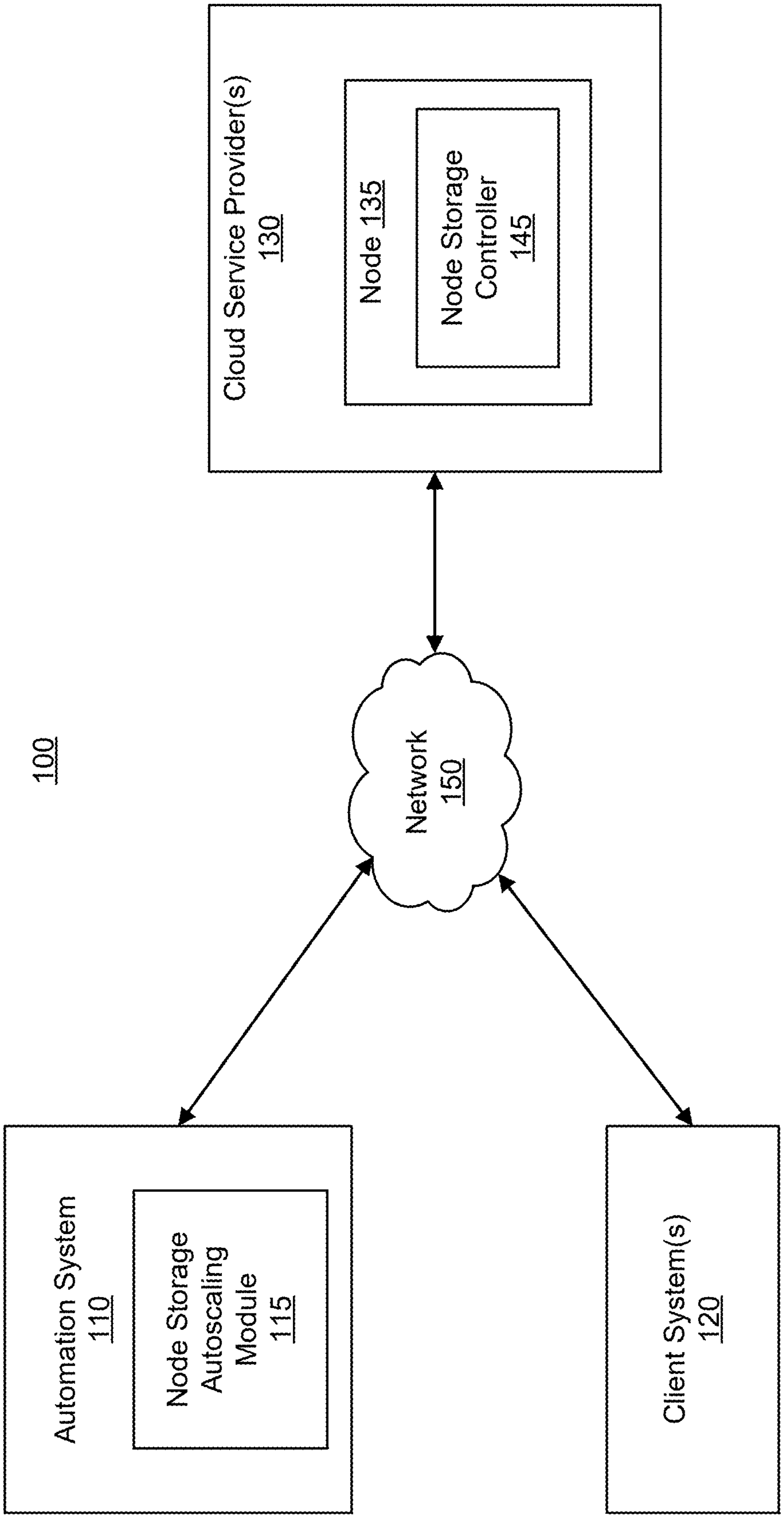
FIG. 1 is a block diagram of a system environment in which an automation system performs autoscaling of node storage, in accordance with one or more embodiments.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

In container orchestration platforms such as Kubernetes, each worker node is provisioned with node-attached storage that hosts the operating system and all data managed by Kubernetes components, for example, container runtime storage for image layers, writable container layers, ephemeral storage volumes, and related transient data. The size and type of this storage are typically configured by cloud service provider during node provisioning and remains fixed for the life of the node. Changing the configuration of the node-attached storage on a running node is generally impractical. Even if a cloud provider provides an API to resize a volume, resizing the node's filesystem often requires disruptive manual intervention, node re-creation, and workload migration. As a result, operators tend to significantly over-provision storage to mitigate the risk of running out of storage. This leads to wasted storage resources and increased cost. On the other hand, workload-driven spikes in demand can still lead to events that trigger Kubernetes to evict pods, discard ephemeral data, and disrupt running workloads.

The system disclosed herein addresses these issues by providing an automated system for dynamically autoscaling node-attached storage without node restarts or application downtime. A node storage controller operating on each worker node continuously collects metrics, such as capacity utilization, provisioned IOPS and throughput, and observed read/write rates. The collected metrics are transmitted to a storage autoscaling module that includes components for usage analysis, adaptive threshold evaluation, configuration optimization, provisioning orchestration, filesystem management, feedback, and machine learning prediction. When usage patterns, performance indicators, or forecasted demand approach pre-defined adaptive thresholds, the system selects an optimal target storage configuration in real time, balancing capacity, IOPS, throughput, disk type, and cost. The system sets the adaptive thresholds to values that are conservatively below eviction triggers, thereby avoiding eviction events. The system orchestrates storage scaling actions through cloud provider APIs and integrates new or resized storage into the node's active filesystem. This includes both storage expansion when more capacity or performance is needed and storage contraction when utilization falls below predetermined thresholds.

According to one or more embodiments, the system applies an adaptive threshold function that varies according to various factors including the provisioned storage capacity of the worker node, the provisioned input/output operations per second (IOPS), the provisioned throughput, and the observed write rate for the node-attached storage. The adaptive threshold function may be defined by a sigmoid curve that increases the scale-up trigger percentage as the provisioned storage capacity increases, enabling smooth, capacity-aware scaling behavior. The system uses the adaptive threshold function to determine threshold values as conditions determining the various factors change. For example, if one or more factors such as the provisioned IPOS and/or the provisioned throughput change over time, the system may recalculate the adaptive threshold using the adaptive threshold function. The storage capacity is adjusted according to the new value of the adaptive threshold.

According to one or more embodiments, when scaling is required, the system selects a target storage configuration by constructing, in real time, a search graph of feasible configurations defined by disk count, disk size, disk type, IOPS, and throughput. The system filters the graph according to cloud service provider constraints including maximum attachable device counts and modification-frequency limits. The system traverses the graph using a greedy search algorithm to identify the lowest-cost configuration meeting various requirements such as capacity, IOPS, and throughput requirements. As part of executing the target configuration, the system selects between resizing one or more existing storage devices and attaching one or more new storage devices based on whether any provider-imposed modification lockout periods have expired.

For integration of the added or resized storage, the system may perform logical volume management (LVM) operations including initializing the device as a physical volume, adding it to a volume group, extending a logical volume to use the new capacity, and resizing the filesystem without unmounting. If a filesystem such as BTRFS (B-tree file system) is used, the system would perform operations such as adding the device to a filesystem array, performing an online rebalance to redistribute data across available devices, and making the additional capacity available without unmounting the filesystem. Upon completion of the scaling, the system validates the operation by confirming that the operating system recognizes the modified or newly attached devices and that the device capacity and performance parameters match the target configuration. The system updates the historical storage usage dataset with post-scaling measurements.

The system may determine the need for scaling in part by forecasting, from historical storage usage data, a time to reach an estimated usage threshold and initiating scaling in advance and may also evaluate alternative configurations of multiple storage devices to achieve required IOPS (Input/Output Operations Per Second) and throughput at reduced cost. In some embodiments, the system executes a machine learning model trained on historical node-level storage metrics to predict a future time at which an adaptive threshold for capacity utilization, IOPS, or throughput will be exceeded, further enhancing the accuracy and timeliness of scaling decisions.

By tightly integrating continuous monitoring, predictive analytics, provider-aware configuration search, and live filesystem reconfiguration, the system overcomes the shortcomings of existing solutions that rely on static provisioning and manual intervention. Unlike conventional approaches that treat Kubernetes nodes as immutable, the system disclosed enables in-place scaling of node storage while preserving workload continuity. The system avoids the waste resources caused by over-provisioning, mitigates the risk of workload evictions, and optimizes cost-to-performance ratio through intelligent selection of available storage configurations. The system therefore delivers a flexible, automated, and proactive node storage management capability not available in conventional systems.

System Environment

FIG. 1 is a block diagram of a system environment 100 in which an automation system 110 (also referred to as the system or the online system) performs autoscaling of node storage in accordance with one or more embodiments. The system environment 100 includes the automation system 110, one or more client devices 120, and one or more cloud service provider(s) 130, interconnected via a network 150. The cloud service provider(s) 130 host one or more nodes 135, which may be virtual machines (VMs) and are used to run workloads in a container orchestration platform such as Kubernetes. The cloud service provider(s) 130 may include (but are not limited to) Amazone Web Services (AWS)®, Google Cloud Platform (GCP)®, and/or Microsoft Azure®. A node may be referred to herein as a worker node.

The cloud service provider 130 provides computing resources, such as VMs, storage, and networking, over the network 150. VMs are scalable, software-based representations of physical machines that can run operating systems and applications. Networking includes virtualized network components, such as firewalls, and virtual private networks (VPNs). These resources may be made available to users on-demand, enabling flexibility and scalability. In some embodiments, the nodes 135 are part of a Kubernetes cluster, which is a distributed system for managing containerized applications across multiple VMs. Additional details about clusters, Kubernetes services, and cloud service providers (CSPs) are described in U.S. patent application Ser. No. 17/380,729, filed Jul. 20, 2021 (now issued as U.S. Pat. No. 11,595,306), which is incorporated herein in its entirety.

The automation system 110 includes a node storage autoscaling module 115 that monitors and analyzes node-level storage usage and performance metrics. Based on current usage data, historical patterns, and provider constraints, the node storage autoscaling module 115 determines whether to expand or shrink a node's attached storage. The node storage autoscaling module 115 issues provisioning actions to modify existing volumes or attach new block devices, and coordinates with filesystem management tools so that changes are applied online without interrupting operation of the node. The node storage autoscaling module 115 enables proactive, real-time capacity and performance optimization thereby preventing adverse events such as disk pressure and workload eviction. In a container orchestration platform, for example, Kubernetes, workload or pod eviction process may be used to forcefully remove or terminate a running pod from a node. A system performs eviction when certain resource usage thresholds are exceeded, for example, if a node's ephemeral storage usage goes above the configured limit, the system begins reclaiming space by selecting one or more pods to evict. When a pod is evicted, the system provides the pod with a grace period, for example, 30 seconds to finish processing and terminates the pod if it is unable to finish the tasks in the allotted grace period. When a pod is evicted, any ephemeral data stored on the node for that pod, for example, cache files, intermediate results or data, or temporary logs are deleted. The pod may be restarted on a different node, but any state stored in ephemeral storage is lost. Pod eviction can impact workload stability and performance because partial results or cached data are discarded. This may require long running jobs, for example, CI/CD pipelines or machine learning training runs to start over.

A node 135 of the cloud service provider 130 includes a node storage controlled 145. The node storage controller 145 manages and orchestrates storage operations at the node level in support of the node storage autoscaling module 115. The node storage controller 145 maintains continuous awareness of the local storage configuration, monitors real-time usage and performance metrics, and executes storage scaling actions in a way that is transparent to running workloads. The node storage controller 145 provides an interface between the automation system 110 and the node's operating system, ensuring that provisioning changes requested by the backend are correctly applied to the local filesystem and block devices.

In one embodiment, the node storage controller 145 runs as a lightweight agent process on the node, using operating system utilities and APIs to collect metrics such as disk capacity, percentage utilization, IOPS, throughput, and block device state. These metrics are periodically transmitted to the automation system for analysis by higher-level components. The node storage controller 145 may also perform local checks to determine readiness for scaling operations. When instructed to expand or shrink storage, the node storage controller 145 completes all required steps for integrating the change into the node's filesystem. This may include initializing newly attached block devices, adding them to logical volume groups, extending logical volumes, and resizing filesystems, or in the case of BTRFS (b-tree file system), adding or deleting devices and optionally triggering online rebalancing.

According to some embodiments, the node storage controller 145 detects whether the underlying storage is managed by LVM, BTRFS, or other technologies and then automatically selects the correct command set for device registration, volume modification, and filesystem resizing. In environments where shrinking is supported, the node storage controller 145 manages safe redistribution or migration of data prior to detaching devices. From a system architecture perspective, the node storage controller 145 interacts bidirectionally with the provisioning orchestration module, receiving detailed action sequences and reporting status upon completion. The node storage controller 145 forwards updated capacity and performance metrics to the metrics collection pipeline for feedback into future scaling decisions. By handling all storage changes locally with no downtime, the node storage controller 145 ensures that the automation system can dynamically adapt node storage resources while maintaining continuous service availability.

The client device(s) 120 are computing systems associated with various entities. These entities include entities that can provision nodes 135 on the cloud service provider 130, as well as end-users who engage with applications deployed onto the nodes 135. The client devices 120 are also capable of receiving user input as well as transmitting and/or receiving data via the network 150. In one embodiment, a client device 120 is a computer system, such as a desktop or a laptop computer. Alternatively, a client device 120 may be a device having computer functionality, such as a personal digital assistant (PDA), a mobile telephone, a smartphone, or another suitable device. A client device 120 is configured to communicate via the network 150. In one embodiment, a client device 120 executes an application allowing a user of the client device 120 to interact with the automation system 110. For example, the client device 120 may execute a customer mobile application to enable interaction between the client device 120 and the automation system 110 or the cloud service providers 130. As another example, a client device 120 executes a browser application to enable interaction between the client device 120 and the system 110 via the network 150. In another embodiment, a client device 120 interacts with the system 110 through an application programming interface (API) running on a native operating system of the client device 120, such as IOS® or ANDROID™.

The network 150 is configured to facilitate communications among the automation system 110, client device 120, and cloud service provider 130. The network 150 may comprise any combination of local area and/or wide area networks, using both wired and/or wireless communication systems. In one embodiment, the network 150 uses standard communications technologies and/or protocols. For example, the network 150 includes communication links using technologies such as Ethernet, 802.11, worldwide interoperability for microwave access (WiMAX), 3G, 4G, 5G, code division multiple access (CDMA), digital subscriber line (DSL), etc. Examples of networking protocols used for communicating via the network 150 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 150 may be represented using any suitable format, such as hypertext markup language (HTML) or extensible markup language (XML). In some embodiments, all or some of the communication links of the network 150 may be encrypted using any suitable technique or techniques.

System Architecture for Node Storage Autoscaling

Figure 2:
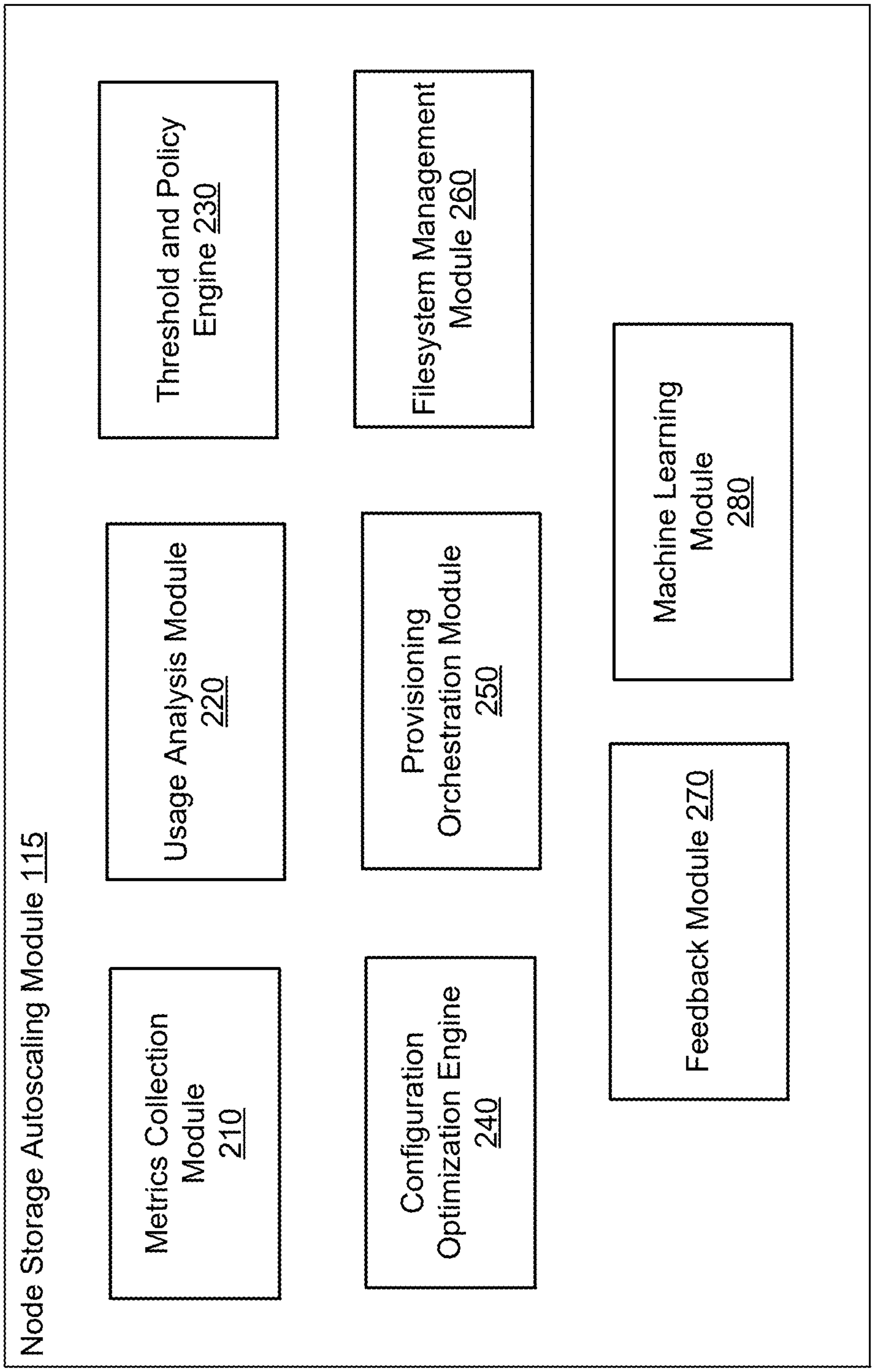
FIG. 2 illustrates an example architecture of a node storage autoscaling module, in accordance with one or more embodiments.

FIG. 2 illustrates an example architecture of a node storage autoscaling module 115, in accordance with one or more embodiments. The node storage autoscaling module 115 includes the metrics collection module 210, the usage analysis module 220, the threshold and policy engine 230, the configuration optimization engine 240, the provisioning orchestration module 250, the filesystem management module 260, the feedback module 270, and the machine learning module 280. The metrics collection module 210 gathers real-time and historical node-level storage performance and utilization data from worker nodes for use in autoscaling decisions. The usage analysis module 220 processes and analyzes the collected telemetry to identify trends, patterns, and potential capacity or performance issues. The threshold and policy engine 230 applies adaptive thresholds and scaling policies to determine when scaling actions should be initiated and the magnitude of those actions. The configuration optimization engine 240 evaluates feasible storage configurations and selects an optimal target configuration that satisfies capacity, IOPS, throughput, and cost constraints. The provisioning orchestration module 250 executes the chosen configuration by issuing API calls to the cloud service provider to attach, detach, resize, or modify storage devices. The filesystem management module 260 integrates newly provisioned or resized storage into the node's existing filesystem without downtime, ensuring immediate availability for workloads. The feedback module 270 validates that scaling operations have been successfully completed and updates historical usage datasets with post-scaling measurements. The machine learning module 280 trains and applies predictive models to forecast future storage requirements and optimize scaling decisions over time. In some embodiments, there may be additional or fewer modules than those illustrated in FIG. 2. Additionally, the functionalities of these modules may be redistributed, multiple modules may be combined into a single module, and/or a single module's functionalities may be divided into multiple modules. The details of individual modules are described as follows.

Metrics Collection Module

The metrics collection module 210 provides continuous, real-time visibility into storage resource utilization and performance on each node participating in the cluster and feeds accurate and timely measurements of key storage metrics into downstream decision-making logic. According to an embodiment, the metrics collection module 210 runs locally within each node as part of, or integrated with, the node storage controller 145 of the node 135, thus maintaining direct access to operating system-level storage statistics. The metrics collection module 210 may be implemented using native operating system tools and APIs (for example, Linux commands such as df, iostat, or filesystem interfaces) to gather metrics such as percentage of disk space used, provisioned versus available capacity, measured IOPS, throughput rates, and a record of prior disk resize or configuration modification events. In some embodiments, the metrics collection module 210 samples these parameters at configurable intervals to balance measurement granularity with resource overhead. The metrics collection module 210 can maintain an in-memory buffer of recent samples for immediate decision use, while also streaming data asynchronously to the backend storage optimization service over secure channels such as gRPC or HTTPS for aggregation, persistence, and historical trend analysis.

In one embodiment, each node-resident metrics collection module 210 communicates directly with a central service that stores the metric streams in a time-series database, where they are correlated with historical usage patterns for predictive scaling. In another embodiment, the metrics collection module 210 first sends its data to a cluster-local aggregator or sidecar service, which normalizes metrics from multiple sources (e.g., kubelet-reported ephemeral storage usage and OS-level I/O counters) before forwarding them upstream. In some embodiments, the metrics collection module 210 enhances the data with derived indicators such as sustained throughput trends, burst IOPS utilization, or rate-of-change of disk usage, for determining thresholds used for autoscaling.

The metrics collection module provides state and performance parameters to the analysis and usage pattern modules, which apply adaptive thresholds and scaling policies. By providing this continuous telemetry, the metrics collection module 210 ensures that the autoscaling subsystem operates on accurate, up-to-date information about both storage capacity and performance characteristics. This enables timely pre-emptive scaling actions that prevent disk pressure conditions and eviction events, while supporting cost-optimized storage allocation based on actual usage and workload behavior over time.

Usage Analysis Module

The usage analysis module 220 transforms raw telemetry obtained from the metrics collection module into actionable insights about storage behavior on each node and processes both recent and historical storage data for making autoscaling decisions using usage trends in addition to instantaneous measurements. This allows the system to anticipate capacity or performance shortfalls and act in advance, reducing the likelihood of Kubernetes disk pressure events or pod evictions. The usage analysis module 220 may operate as a backend service, ingesting periodic metric updates sent from node-resident agents. It applies statistical methods, moving averages, or moving-window calculations to determine short-term shifts in utilization, for example, sudden bursts in write activity, and long-term patterns like gradual growth in persistent workload size. According to an embodiment, the usage analysis module 220 performs predictive analytics that leverages seasonality detection or time-series forecasting to project future storage demand. This allows the system to perform pre-emptive scaling before thresholds are reached.

According to an embodiment, for environments with predictable workloads, the usage analysis module 220 is implemented using deterministic rules and look-back windows. According to an embodiment, the usage analysis module 220 utilizes machine learning regression or classification models trained on historical utilization and performance datasets to dynamically adjust thresholds based on detected workload. The usage analysis module 220 interacts with the threshold and policy engine, supplying it with calculated trend indicators and forecast data that influence scaling trigger points and aggressiveness. In some embodiments, output from this module may also be stored in a historical data store for later audit, tuning, or training of improved prediction models. By turning raw disk metrics into forward-looking signals, the usage analysis module 220 enables the autoscaling system to move from reactive adjustments to proactive, predictive scaling actions, improving node stability and optimizing storage allocation over time.

Threshold and Policy Engine

The threshold and policy engine 230 determines when the system should initiate a scaling operation and the magnitude of the scaling by translating usage metrics and historical trends into actionable scaling triggers. The threshold and policy engine 230 ensures that actions are taken proactively to avoid conditions such as Kubernetes disk pressure evictions while also avoiding over-provisioning. The threshold and policy engine 230 applies adaptive logic that considers multiple dimensions of node storage state, including percentage utilization, provisioned capacity, and disk performance parameters such as IOPS and throughput.

In one embodiment, the threshold and policy engine 230 determined trigger points using these parameters and adjusts them by disk size category. For example, a small disk of 40 GB with high performance provisioning may have a scale-up threshold at 51% utilization, while larger disks may trigger scaling only when approaching 80% utilization, thereby staying safely below the Kubernetes default eviction threshold of 85%. The threshold and policy engine 230 enforces a cap to ensure scaling occurs early enough for capacity changes to be applied before eviction processes start. According to an embodiment, the threshold and policy engine 230 uses sigmoid-based functions to adjust threshold values across increasing disk sizes. Use of sigmoid function helps avoid abrupt changes in behavior as disk capacity grows.

The threshold and policy engine 230 supports multiple policy modes, such as conservative, default, and aggressive which control the increment size of capacity or performance adjustments. In the conservative mode, only a modest percentage increase is applied, suitable for gradual growth environments. In the aggressive mode the capacity is multiplied by larger factors for fast-growing or bursty workloads. The default policy mode selects a balanced path between capacity safety and cost efficiency. The system supports manual policy selection as well supports dynamic and automatic policy selection based on historical workload behavior, seasonality patterns, or predictions based on machine learning models trained on cluster data.

The threshold and policy engine 230 interacts with the usage analysis module to receive trend and prediction data, and with the configuration optimization and search engine to inform capacity and performance targets for the next scaling action. Once the threshold and policy engine 230 finalizes a decision to scale, along with the target capacity and performance level, it provides the information to the provisioning orchestration module 250 to execute the change through cloud provider APIs and filesystem integration.

Configuration Optimization Engine

The configuration optimization engine 240 translates a scaling directive, for example, directive to increase capacity to a specified target, into a concrete, provider-aware storage configuration that achieves the target at minimal cost while meeting all technical and operational constraints. The configuration optimization engine 240 operates as a planner and an optimizer, evaluating a design space of potential configurations in real time. In one embodiment, the configuration optimization engine 240 models the set of possible configurations as nodes in a graph data structure. Each node in this graph represents a distinct combination of disk count, disk size, disk type, provisioned IOPS, and throughput. Edges represent transitions between configurations that can be achieved with a legal set of actions, such as resizing an existing disk, attaching one or more new disks, or replacing a disk with one of a different type. To respect operational and provider-imposed rules, the engine filters the configuration space against constraints including required total capacity, required performance parameters, cloud service provider attachment limits, and recent modification cooldown periods that prevent successive changes to the same device within a restricted time window.

The configuration optimization engine 240 may be implemented using a greedy search across the remaining feasible configurations, weighing each transition using cost, number of required actions, and other criteria. The cost scoring function may incorporate live or periodically refreshed pricing data from the relevant cloud provider. The configuration optimization engine 240 may use cached cost tables suitable for environments with more static pricing. The greedy approach allows rapid convergence to a low-cost acceptable solution without exhaustive search, thereby supporting real-time autoscaling operations that minimize latency.

The configuration optimization engine 240 implements various strategies to perform autoscaling of node storage, for example, resize-in-place, selecting the smallest expansion that satisfies constraints, attaching new disks, and for environments that support multiple disk types, switching to a different disk class when it produces a superior cost-performance profile. The configuration optimization engine 240 receives target scaling directives from the threshold and policy engine along with real-time node state and constraint data from the metrics collection and usage analysis modules and provides provisioning plan to the provisioning orchestration module 250, specifying the API calls to the cloud provider and the sequence of local volume management or filesystem commands needed to realize the transition. It may provide feedback to the usage analysis module 220 for future policy adjustments based on the observed efficiency of chosen configurations.

Provisioning Orchestration Module

The provisioning orchestration module 250 performs the actual storage resource changes on a target node as determined by the autoscaling decision by translating an optimal scaling plan into a sequence of executable actions that interact with external cloud service provider environments. The provisioning orchestration module 250 ensures that changes to physical or virtual storage are performed reliably, in compliance with provider-specific constraints. The provisioning orchestration module 250 interfaces with cloud service provider APIs to perform actions such as attaching new block devices, detaching unused devices, resizing volumes, or modifying performance characteristics like IOPS and throughput. The provisioning orchestration module 250 maintains a library of provider-specific drivers or adapters. The provisioning orchestration module 250 may operate through an intermediate layer, such as an orchestration framework, to normalize interactions across heterogeneous providers. This approach enables the same scaling plan to be executed in different environments without requiring the higher-level optimization logic to account for specific API differences. The provisioning orchestration module 250 receives detailed action plans from the configuration optimization engine, and upon completing provisioning actions, triggers the filesystem and volume management components on the worker node, for example, to incorporate new devices into an LVM group or BTRFS filesystem. The provisioning orchestration module 250 provides status updates back to feedback module 270, allowing the system to verify that changes took effect and to update the current state model for future scaling decisions.

Filesystem Management Module

The filesystem management module 260 incorporates newly provisioned or resized storage devices into a node's active filesystem without requiring downtime or service interruption. It ensures that the augmented storage is available to both the OS and Kubernetes components immediately. The filesystem management module 260 abstracts the implementation differences between supported filesystems so that the same high-level orchestration logic can be applied across heterogeneous node environments. For example, if the node's storage stack is based on logical volume management, the filesystem management module 260 executes a series of steps to bring new capacity online, for example, initializing the new block device as a physical volume (pvcreate), adding it to an existing volume group (vgextend), extending the logical volume to consume the added capacity (lvextend), and resizing the filesystem itself using the appropriate command for the filesystem type, such as resize2fs for ext4 or xfs_growfs for xfs. Each operation is performed online, preserving active workloads and avoiding unmounting operations. If the node uses BTRFS as the filesystem, the filesystem management module 260 leverages native volume management features of BTRFS, for example, by issuing a BTRFS device add command to register the new device in the existing array, an online rebalance to redistribute data across participating devices. For BTRFS file system, the filesystem management module 260 may accomplish capacity reduction via BTRFS device delete, which migrates data off the target device before its removal, without unmounting. These operations enable both capacity increases and decreases to be handled natively by the filesystem with minimal orchestration.

The filesystem management module 260 may be implemented as an agent running on the node or as a remotely triggered set of instructions. The filesystem management module 260 receives execution plans from the provisioning orchestration module 250. Upon successful integration of the new capacity, the filesystem management module 260 may signal the metrics collection module 210 and usage analysis module 220 to update the node's storage state and performance data. This ensures that subsequent autoscaling decisions are made with accurate information describing available resources. The filesystem management module 260 ensures that added or resized storage is immediately usable by the node OS and Kubernetes components, supporting seamless autoscaling with no disruption to running workloads.

Feedback Module

The feedback module 270 verifies that executed scaling actions have completed successfully and updates the system's information describing the current node storage state. It ensure that any change in capacity, performance parameters, or device composition is correctly applied and is available for use by running workloads. The feedback module 270 provides accurate status back into the monitoring and decision-making subsystems to allow rapid detection of provisioning errors. The feedback module 270 interfaces with the node's operating system to validate the results of a scaling plan by confirming that newly attached devices are visible in the OS device list, checking that logical volume or filesystem structures have been updated to include the new capacity, and measuring IOPS or throughput to confirm that performance goals have been met. The feedback module 270 may perform these checks through standard system commands, filesystem utilities, and benchmarking tools, and then compare measured values against the target configuration provided by the configuration optimization engine.

The feedback module 270 interacts with the provisioning orchestration module to receive expected configuration details after a scaling action is initiated. Once validation is complete, the feedback module 270 sends its results to the metrics collection module 210 so that telemetry reflects the updated capacity and performance state. The feedback module 270 may provide the information to the usage analysis module 220 and threshold policy engine 230, allowing them to refine scaling decisions based on the verified actual state rather than intended state. The feedback module 270 may detect discrepancies such as missing devices, incorrect capacity expansions, or degraded performance and trigger automated remediation steps, such as reissuing provisioning commands or alerting administrators.

Machine Learning Module

The machine learning module 280 is responsible for developing, training, and deploying predictive models that assist in making intelligent autoscaling decisions for node-attached storage in a container orchestration environment. It leverages historical and real-time telemetry from worker nodes to forecast future storage capacity and performance needs, ensuring scaling actions are initiated proactively rather than reactively. The machine learning module 280 incorporates workload behavior patterns, seasonality, and performance metrics such as IOPS and throughput into its predictions, thereby enabling the system to optimize scaling operations for cost efficiency, workload stability, and timely avoidance of disk pressure events.

The machine learning module 280 receives node-level metrics from the node storage controller 145, including capacity utilization percentages, provisioned performance parameters, block device counts and types, and recent modification events. The machine learning module 280 may process the data by aggregating it, normalizing it into consistent time intervals, and adding derived features such as usage growth rate, time-to-threshold estimates, and workload burstiness indicators. It then applies these features to one or more predictive models, for example, time-series forecasting models or classification models (such as gradient boosting trees or neural networks) to predict resource shortage and recommend scaling actions.

The machine learning module 280 may incorporate online learning or incremental model updates to adapt continuously as new telemetry arrives without retraining from scratch. The machine learning module 280 may schedule model retraining periodically, or triggered by drift detection, or by significant changes in workload profiles detected by the feedback module 270. The machine learning module 280 receives data inputs from the node storage controller 145 and the feedback module 270 and provides prediction outputs to the configuration optimization engine 240 for integration into the graph-based search and selection of target storage configurations. The machine learning module 280 can trigger orchestration steps in the provisioning orchestration module 250 to execute scaling before Kubernetes eviction conditions occur.

Processes

Figure 3:
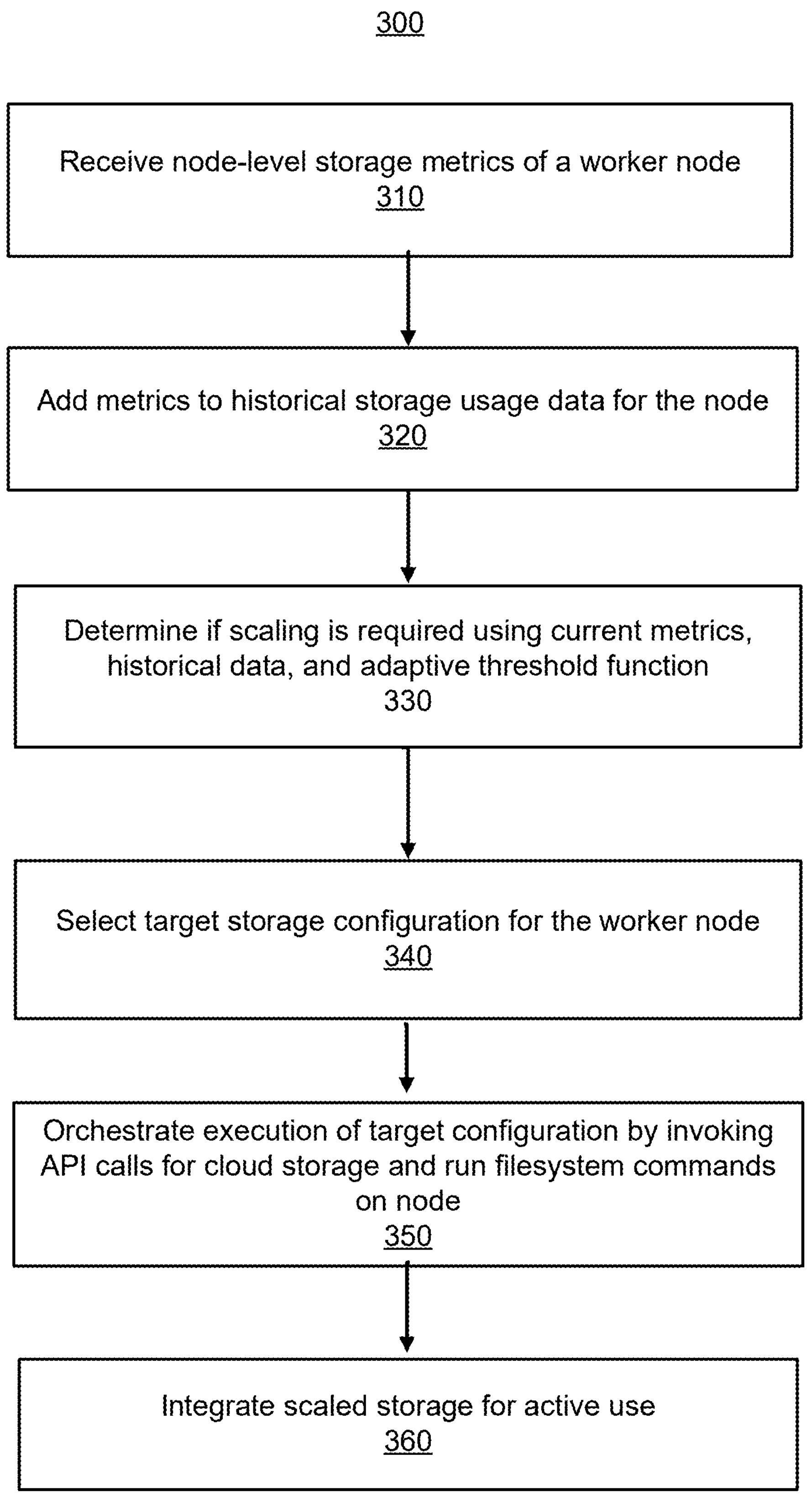
FIG. 3 is a flowchart of a method for automatic scaling of note-attached storage of worker nodes in a container orchestration platform, in accordance with one or more embodiments.

FIG. 3 is a flowchart of a method 300 for automatic scaling of note-attached storage of worker nodes in a container orchestration platform, in accordance with one or more embodiments. In various embodiments, the method includes different or additional steps than those described in conjunction with FIG. 3. Further, in some embodiments, the steps of the method may be performed in different orders than the order described in conjunction with FIG. 3. The method described in conjunction with FIG. 3 may be carried out by the automation system 110 in various embodiments, while in other embodiments, the steps of the method are performed by any online system capable of performing these steps.

The node storage controller 145 receives 300 node-level storage metrics of a worker node in the container orchestration platform. In one embodiment, collection is performed using an agent process running locally on each worker node. The agent continuously monitors disk capacity utilization, provisioned IOPS, throughput, block device configuration, and modification history using operating system interfaces such as /proc and /sys filesystems, native utilities (e.g., df, lsblk, iostat), or vendor-specific cloud instance metadata endpoints. In alternative embodiments, the metrics may be gathered via container runtime APIs or Kubernetes storage metric exporters. The node storage controller 145 transmits the metrics in real time or in scheduled batches to the backend automation system 110 using secure channels such as HTTPS or gRPC.

The feedback module 270 adds 310 the node-level storage metrics of the worker node to historical storage usage data stored for that worker node. In one embodiment, this involves persisting incoming metrics into a time-series database, keyed by node identifier, and aligning new data with existing records to maintain continuous timelines. Preprocessing may include normalization of metrics to consistent intervals, deduplication of repeated samples, and annotation of records with contextual data such as workload type or cluster membership. Alternative embodiments may store historical usage in a distributed object store, where periodic aggregation jobs produce condensed statistical summaries for later use by predictive algorithms.

The node storage autoscaling module 115 determines 320 whether node-attached storage requires scaling based on the current metrics and historical usage data, and an adaptive threshold function for the worker node. According to an embodiment, the node storage autoscaling module 115 analyzes the current metrics to predict a likelihood of an eviction event initiated by the container orchestration platform. This allows the system to determine 320 whether node-attached storage requires scaling prior to an eviction event initiated by the container orchestration platform, thereby taking measures to avoid the eviction event from occurring altogether. In one embodiment, the adaptive threshold function computes trigger points by factoring capacity, performance parameters, and observed write rates, using a technique such as a sigmoid curve that increases allowable utilization percentage with larger disk sizes while capping it below the Kubernetes default eviction threshold (e.g., 80%). In alternative embodiments, this computation may be augmented by machine learning models trained to predict imminent resource saturation using seasonal patterns, workload classifications, and trending data. The output is a binary scale/no-scale decision accompanied by recommended scaling magnitude.

The node storage autoscaling module 115 selects 330 a target storage configuration for the worker node in response to a determination that scaling is required. In one embodiment, this selection involves generating a graph of feasible configurations defined by disk count, disk size, disk type, and provisioned performance parameters (IOPS, throughput), subject to constraints such as provider attach-limits and modification cooldowns. A greedy search algorithm traverses the graph to identify the lowest-cost configuration meeting target capacity and performance requirements. The search algorithm may be heuristic based and may not be able to find the lowest cost path from the current storage configuration to the target storage configuration but may find a low cost path that is lower than one or more other paths. Alternative embodiments may use cost-function optimization or integer linear programming for configuration selection, or may consult pre-computed decision tables in environments with stable hardware and pricing.

The provisioning orchestration module 250 orchestrates 360 execution of the target storage configuration by invoking application programming interface (API) calls causing the worker node to execute filesystem management commands to integrate the modified or newly attached devices. In one embodiment, cloud provider SDKs or REST APIs are used to attach new block devices, resize existing ones, or change performance parameters. Upon completion of provisioning operations, the filesystem management module 260 runs the necessary commands on the node to integrate the devices: for LVM setups, initialization of physical volumes (pvcreate), extending volume groups (vgextend), extending logical volumes (lvextend), and resizing filesystems (resize2fs for ext4 or xfs_growfs for xfs); for BTRFS setups, adding devices (btrfs device add), rebalancing, or removing devices (btrfs device delete). In alternative embodiments, integration may be achieved using other volume management layers (e.g., ZFS) or vendor-specific filesystem drivers that support online resizing and device hot-addition, ensuring that scaled storage is immediately available for active workloads without requiring node restarts.

Alternative Embodiments of Node Storage Autoscaling

In some embodiments, the adaptive threshold function is configured to dynamically adjust scaling trigger points based on multiple operational parameters of the worker node's storage. This allows the system to avoid relying on a fixed utilization percentage and instead vary the threshold according to the specific capacity and performance characteristics of the provisioned storage and the actual workload behavior. For example, the scaling decision logic can factor in the provisioned storage capacity so that smaller disks trigger scaling at a lower utilization percentage, while larger disks trigger scaling later, thereby balancing the headroom available. The system may consider provisioned input/output operations per second (IOPS) to determine the threshold, such that nodes with high IOPS capability and sustained performance can tolerate higher utilization before scaling, whereas nodes with limited IOPS may require earlier intervention to prevent performance degradation under load. The system may consider provisioned throughput to allow the system to scale sooner in cases where throughput limits might be reached before capacity limits. The system may fine-tune the adaptive threshold in real time based on an observed write rate for the node-attached storage, by projecting the time to fill available capacity under current write conditions.

The system may use a multi-variable function or model, such as a weighted formula, logistic curve, or sigmoid function that receives these parameters as inputs and outputs a scaling trigger point specific to the node's current state. The system may determine coefficients for each parameter in the function through benchmarking and historical pattern analysis. The system may adaptively tune coefficients over time using feedback from post-scaling outcomes or through a machine learning model trained on historical telemetry and scaling events. In some embodiments, the threshold determination is policy-driven, with each policy, for example, conservative, default, aggressive, defining different weights.

In some embodiments, the system implements an adaptive threshold function using a technique such as a sigmoid curve to dynamically adjust the scale-up trigger percentage in relation to the provisioned storage capacity of the worker node. This provides a non-linear progression of threshold values so that smaller disks begin scaling at lower utilization percentages, while larger disks trigger scaling at higher utilization levels, thereby avoiding abrupt changes in scaling behavior as capacity changes. The system may determine the threshold as a function of capacity where the curve is parameterized by baseline utilization, maximum allowable utilization, etc. that can be tuned empirically or adaptively based on historical usage patterns and performance observations. For example, the sigmoid function may be configured so that a 40 GB disk triggers scaling at approximately 51% utilization, gradually increasing to a cap of 80% for disks in the terabyte range. Alternative embodiments may use logistic functions or other curves, to achieve similar gradual scaling behavior. Thereby the system creates a threshold function that scales intelligently with capacity, ensures preemptive action ahead of eviction events, and optimizes both performance and cost efficiency.

In some embodiments, the selection of the target storage configuration is performed by dynamically modeling the available storage options for the worker node as a search graph, with each node in the graph representing a feasible configuration defined by parameters such as disk count, disk size, disk type, provisioned IOPS, and provisioned throughput. This graph may be generated in real time based on the node's current state as reported by the node storage controller 145, provider-specific disk catalogs, and real-time or cached pricing data. The candidate configurations are filtered to remove those that violate hard constraints imposed by the cloud service provider, which may include maximum allowable numbers of attachable devices for the instance type in use, as well as modification-frequency limits such as provider-enforced cooldown periods after resize operations. Once filtered, the remaining configurations are evaluated by traversing the graph using a greedy search strategy that iteratively selects the configuration change offering the best incremental improvement toward the target capacity and performance requirements at the lowest incremental cost. This traversal may consider multi-disk arrangements (e.g., RAID0 striping of smaller volumes) where the aggregate meets or exceeds IOPS and throughput targets at reduced cost compared to a single larger device. In alternative embodiments, the search traversal may use other heuristic or optimization algorithms such as A* search, branch-and-bound, or linear programming, or may integrate with a machine learning model trained on prior scaling outcomes to bias configuration selection toward historically optimal choices. This approach ensures that each scaling decision is both compliant with provider limitations and optimized for cost-to-performance trade-offs in the context of the node's current and forecasted workload demands.

In some embodiments, the orchestration of the target storage configuration includes a decision-making step in which the system chooses whether to resize existing storage devices or attach new ones according to the current modification constraints imposed by the cloud service provider. Cloud providers may enforce lockout periods or throttling limits after a disk modification. The provisioning orchestration module 250 evaluates metadata collected by the node storage controller and stored in the backend, including the type of each attached device, the timestamp and nature of the last modification, and the provider's specific quota or cooldown rules. If the lockout period for an existing device has expired, the system may resize that device to meet the desired capacity or performance targets. If the lockout period is still active, the system may provision one or more new devices and attach them to the node, integrating them into the existing logical volume or filesystem so that the aggregate configuration meets the target specifications.

The system may perform real-time lookups for provider-specific constraints, and combine it with the solution space graph used by the configuration optimization engine to ensure compliance and cost efficiency. The system may also consider hybrid strategies in which partial capacity increases are achieved by resizing some eligible devices while attaching additional devices to cover any remaining shortfall, optimizing for minimal disruption and expenditure. In another embodiment, the system uses machine learning models to predict when lockout periods are about to expire and schedule resize operations accordingly, delaying or batching certain changes to reduce the number of attached devices and preserve attachment slots on instances with low volume limits.

In some embodiments, the integration of a modified or newly attached storage device into the existing node storage architecture is carried out using a series of filesystem management operations within a logical volume management (LVM) framework to enable seamless expansion without service disruption. The system brings the new capacity online and make it immediately available for workloads by performing all operations while the filesystem remains mounted, thereby avoiding downtime and preserving workload continuity. Alternative embodiments could adapt the specific commands and tooling based on the filesystem type and operating system in use. For example, where BTRFS is employed, filesystem expansion can be done through native BTRFS device add and BTRFS filesystem resize commands.

In some embodiments, the system integrates a modified or newly attached storage device into the node's active filesystem using commands that allow the device to be added to an existing filesystem array and utilized without requiring downtime. The system leverages a filesystem, such as BTRFS that combines volume management and filesystem operations into a single layer, enabling the addition of block devices directly into the storage pool and triggering online operations to redistribute data evenly across all available devices. This process is executed while the filesystem remains mounted and accessible to workloads, thereby making the additional capacity immediately available for use without interrupting container runtime or Kubernetes services.

In some embodiments, once the target storage configuration has been executed, the system performs a validation process to confirm that the scaling operation has completed successfully and that the node is operating with the intended capacity and performance characteristics. The system ensures, through automated verification, that the modified or newly attached block devices are recognized by the node's operating system and are integrated into the live storage subsystem as planned. This validation step may include enumerating the system's block device list, comparing detected device identifiers and sizes against the expected configuration, and querying the logical volume or filesystem to confirm the reported total capacity matches the target specification. Additionally, the system can run performance diagnostic checks, such as synthetic I/O tests or API-based metric queries, to verify that provisioned IOPS and throughput meet or exceed the configured values. These checks may be performed by the node storage controller in coordination with the backend storage optimization service, using standard OS utilities, cloud provider APIs, or a combination thereof. Following successful verification, the system updates the historical storage usage dataset with post-scaling measurements, capturing both capacity and performance baselines immediately after the change. This updated dataset is stored in the metrics repository alongside prior historical data, enabling the adaptive threshold and scaling logic to account for the new configuration in future decisions.

Machine Learning Based Autoscaling of Node Storage

According to some embodiments, the system implements machine learning based predictive scaling capabilities for node-attached storage in a container orchestration environment. The system is configured to collect node-level telemetry, including capacity utilization, provisioned input/output operations per second (IOPS), provisioned throughput, current block device configuration, modification history, and historical usage patterns. The system utilizes this telemetry for seasonality analysis, time-series prediction, and other predictive mechanisms to determine when scaling will be needed. In some embodiments, the system trains and deploys machine learning models on the accumulated historical metrics to automatically forecast future storage demand and proactively trigger scaling actions before Kubernetes disk-pressure eviction thresholds are reached. In addition, the same predictive framework may be extended to dynamically select appropriate scaling policies, such as aggressive, default, or conservative, for a given cluster or workload based on learned behavioral patterns.

Data for training predictive models may be gathered and preprocessed by a node storage controller (145) executing on each worker node in the container orchestration platform. The node storage controller continuously monitors node-level storage metrics, including capacity utilization, IOPS, throughput, block device configuration, and modification history, and transmits these metrics securely to a backend storage optimization service over telemetry channels. Performance patterns such as sustained read/write rates, burst usage, and trend signatures are captured, and events related to near-threshold usage, eviction incidents, or performance saturation are logged to enrich the training set.

Preprocessing of this data can include aggregation of metrics from heterogeneous sampling intervals into normalized time windows, synchronization of current metrics with stored historical usage data to create contiguous time-series records, and feature engineering to derive usage growth rates, estimated time-to-threshold given current write rates, ratios of performance usage to provisioned IOPS/throughput, and seasonality indicators for recurring workload cycles. Contextual features, such as cloud service provider disk attachment quotas and modification cooldown intervals, can be encoded so the resulting models respect operational constraints.

The resulting preprocessed dataset is used for training a variety of machine learning models. For predictive scaling use cases, where the system anticipates storage usage approaching pre-eviction thresholds and adjusts capacity or performance parameters proactively the most effective approaches include: (i) time-series forecasting models, (ii) classification models such as gradient boosting and random forests for early warning predictions based on current and derived features; (iii) reinforcement learning methods; and (iv) hybrid or ensemble approaches that combine forecasting models to predict future utilization, classification models to flag imminent threshold breaches, and rule-based policy layers to incorporate cloud provider throttles and adaptive scale amounts.

These techniques address both the timing and magnitude of scaling actions: time-series models forecast when thresholds will be crossed, classification models decide whether imminent scaling is necessary, reinforcement learning optimizes how much to scale under practical constraints, and ensemble strategies ensure adaptability to both predictable seasonal demands and unanticipated workload bursts. This architecture enables the invention to provide proactive, intelligent autoscaling decisions that improve workload stability and optimize resource allocation in a dynamic, constraint-bound Kubernetes environment.

In some embodiments, the system gathers raw telemetry data for machine learning-based predictive models using a node storage controller 145 executing locally on each worker node of the container orchestration platform. The node storage controller 145 continuously monitors node-level storage metrics, including capacity utilization expressed as a percentage of provisioned capacity, provisioned input/output operations per second (IOPS), provisioned throughput, block device configuration parameters such as disk count, size, and type, modification history including resize events and attach/detach operations, and observed read/write rates capturing both sustained and burst patterns. These metrics are transmitted in real time over secure telemetry channels to a backend node storage autoscaling module 115 within the automation system 110. The backend persistently stores the incoming metrics alongside historical usage data, thereby maintaining a long-term, time-series record for each worker node.

Prior to training predictive models, the stored telemetry may be preprocessed to improve model accuracy and robustness. Preprocessing can include aggregation of metrics into normalized time intervals, feature engineering to derive additional indicators such as usage growth rate, seasonality patterns, estimated time-to-threshold based on current write rates, and ratios of performance consumption to provisioned IOPS or throughput, or noise reduction to smooth or filter transient spikes caused by ephemeral workloads. Once processed, the dataset is suitable for training a variety of forecasting models, trained to predict when storage scaling will be required and, in some embodiments, recommend an appropriate scaling policy for a given node, such as conservative, default, or aggressive. Trained models can be deployed into the real-time autoscaling decision loop of the backend to augment or replace static threshold logic.

The models can be retrained periodically, or incrementally updated, using newly collected historical data so that scaling triggers, thresholds, and policy selections evolve alongside workload patterns. This enables the predictive scaling subsystem to adapt over time to shifting workload behaviors, changing cloud provider constraints, and evolving performance requirements. Retraining can be performed offline and asynchronously using the historical metrics database, executing on a separate processing cluster or allocated backend resources. During these training operations, the real-time scaling loop may continue to rely on the current production model or on the existing adaptive threshold logic. Training jobs may be initiated periodically, for example on a nightly or weekly schedule, or in response to specific events such as detection of significant changes in workload patterns.

When a scaling decision is made, the provisioning orchestration module executes the configuration changes through cloud provider APIs, and the filesystem management module integrates the changes into the live node environment without downtime. The feedback module 270 then validates the scaling outcome and updates the historical dataset, enabling iterative refinement or incremental retraining of the predictive models. By embedding these evolving predictive models into the real-time scaling decision loop, the disclosed minimizes eviction risk, optimizes cost-to-performance ratio, and reduces the frequency of disruptive scaling events while maintaining responsiveness to changing workload patterns.

Graph Based Configuration Optimization

According to various embodiments, the configuration optimization engine 240 implements a graph-based real-time configuration optimization process to find an optimal target configuration and a path to achieve the target configuration. When a scaling event is required, there are often many possible ways to achieve the needed capacity, IOPS, and throughput targets, each with different cost, performance, and feasibility trade-offs. These options may vary by disk type, size, count, RAID/striping layout, and cloud service provider (CSP) constraints such as maximum attachable devices, modification cooldown periods, and pricing tiers. Existing solutions either rely on complex optimization techniques, manual decision making, or simplistic arbitrary policies that fail to consider the full solution space in real time. This results in sub-optimal cost, over-provisioning, poor performance, or outright inability to execute due to CSP constraints.

The configuration optimization engine 240 addresses this problem by modeling multiple feasible storage configurations as a graph, where each node represents a complete, valid hardware configuration for the worker node (disk count, size, type, provisioned performance parameters, cost), and each edge represents a legal transition from one configuration to another (e.g., resize existing disks, attach new ones, change disk type, adjust IOPS/throughput). The current node state is the graph's starting vertex; the required target performance and capacity form the search criteria. The engine applies filtering to remove configurations that violate CSP constraints or operator policies, then executes a graph search, for example, a greedy search traversal to identify the lowest-cost path from the current state to a target configuration meeting all requirements. The resulting path is converted into an ordered action plan for the provisioning orchestration module 250, including the precise API calls to the CSP and the filesystem operations to integrate the changes online.

By generating this graph dynamically from real-time node telemetry and live CSP constraints, the invention overcomes a key shortcoming of prior approaches: static or one-dimensional decision logic that cannot adapt to the actual combination of available devices, current usage, modification history, and market pricing at the moment scaling is triggered. This design enables cost-optimal, constraint-aware, and performance-compliant scaling decisions to be made on demand, avoiding provisioning failures, minimizing spend, and maintaining workload stability without downtime.

Figure 4:
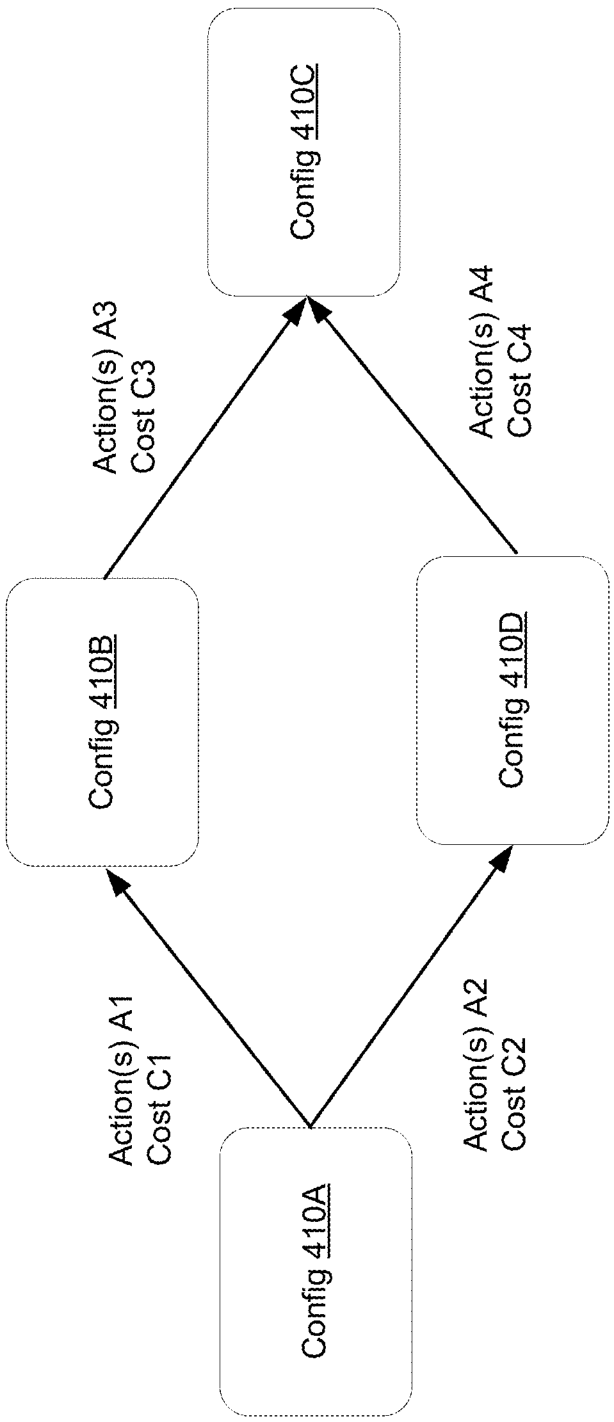
FIG. 4 illustrates an example configuration graph showing configurations used for configuration optimization, according to an embodiment.

FIG. 4 illustrates an example configuration graph showing configurations used for configuration optimization, according to an embodiment. The configuration optimization engine 240 generates a solution space graph in which each vertex represents a distinct, feasible storage configuration for a worker node. In one embodiment, the configuration optimization engine 240 generates a solution space graph in which each vertex represents a distinct, feasible storage configuration for a worker node. For example, Config A may represent a baseline setup composed of two 500 GB gp3 disks provisioned at 3,500 IOPS and 125 MB/s throughput each. Config B may represent a single 1 TB gp3 disk provisioned at 7,000 IOPS and 250 MB/s throughput. Config C may represent a higher-capacity and performance arrangement such as three 750 GB premium SSD v2 devices, each with 4,000 IOPS and 200 MB/s throughput. Config D may represent a RAID0 array built from two 500 GB gp3 disks, designed to stripe data for improved aggregate performance, but still maintaining the same baseline disk type and per-disk performance limits as Config A.

Edges between these vertices denote permissible provisioning actions, such as resizing existing disks, attaching new disks, changing disk types, or implementing striping and are annotated with decision cost weights quantifying the incremental monthly cost or operational impact. For example, the edge from Config A to Config B represents a "resize existing disk" action A1 with a cost weight of C1=$20, while the edge from Config B to Config C represents an "add new disk set" action A3 with a cost weight of C3=$25. The edge from Config A to Config D, which implements RAID0 striping on the existing pair of 500 GB gp3 disks, may have a relatively low action cost (e.g., C2=$15) but provides only a moderate improvement in performance because it retains the same per-disk IOPS and throughput limits. From Config D, reaching Config C would still require replacing the disks with higher-performance premium SSD devices, an action with a high associated cost (e.g., C4=$40).

In operation, the graph search module 550 evaluates all viable paths from the current configuration (Config A) to target configurations satisfying the required capacity, IOPS, and throughput thresholds. In the illustrated example, the engine selects the Config A→ConfigB→Config C path because its cumulative cost weight (C1+C3=$20+$25=$45) is lower and more direct than alternatives. By contrast, the Config A→Config D→Config C path, though starting with a low-cost RAID0 conversion, leads to a more expensive overall upgrade (C2+C4=$15+$40=$55) and includes an intermediate step (Config D) that does not bring the system closer to the final desired capacity/performance profile in a cost-efficient way. The RAID0 arrangement in Config D may improve throughput under parallel workloads, but it does not address capacity or IOPS scaling as efficiently as resizing in Config B, making the overall A-D-C path less optimal both in economics and performance progression. Once the optimal path is chosen, the provisioning plan generator 560 translates it into the sequence of API calls and filesystem commands needed to transition from Config A to Config C without downtime.

Although the above example uses a cost metric in terms of dollars or a currency, the cost may be represented as any metric that can be compared and added. For example, it can be a numeric value obtained by aggregating various metrics optionally weighted to determine a score value for each path.

The scores are aggregated for a path compared with scores of other paths to determine which path is optimal.

In addition to the cost weights associated with each edge, the solution space graph models constraints that can influence the feasibility of a given path between configurations. These constraints may include hard cloud service provider limits, such as the maximum number of attachable volumes for a given instance type, modification-frequency lockout periods that prevent resizing an existing volume within a defined time window, and minimum or maximum provisioned IOPS/throughput thresholds tied to particular disk types. Other constraints may stem from performance or resilience policies, such as requiring RAID0 stripe sets to be grown symmetrically, or operator preferences on disk type selection. Each edge is annotated not only with its decision cost weight but also with these constraint parameters, and during the graph search process, the configuration optimization engine 240 evaluates both cost and constraint satisfaction before that edge is considered traversable. This ensures that the chosen path, such as Config A→B→C in the example is not only the lowest-cost option but also compliant with operational, provider, and policy requirements, while paths like Config A→D→C may be eliminated if they violate attachment limits, fall within a modification cooldown, or fail to meet performance goals.

System Architecture of Configuration Optimization Engine

Figure 5:
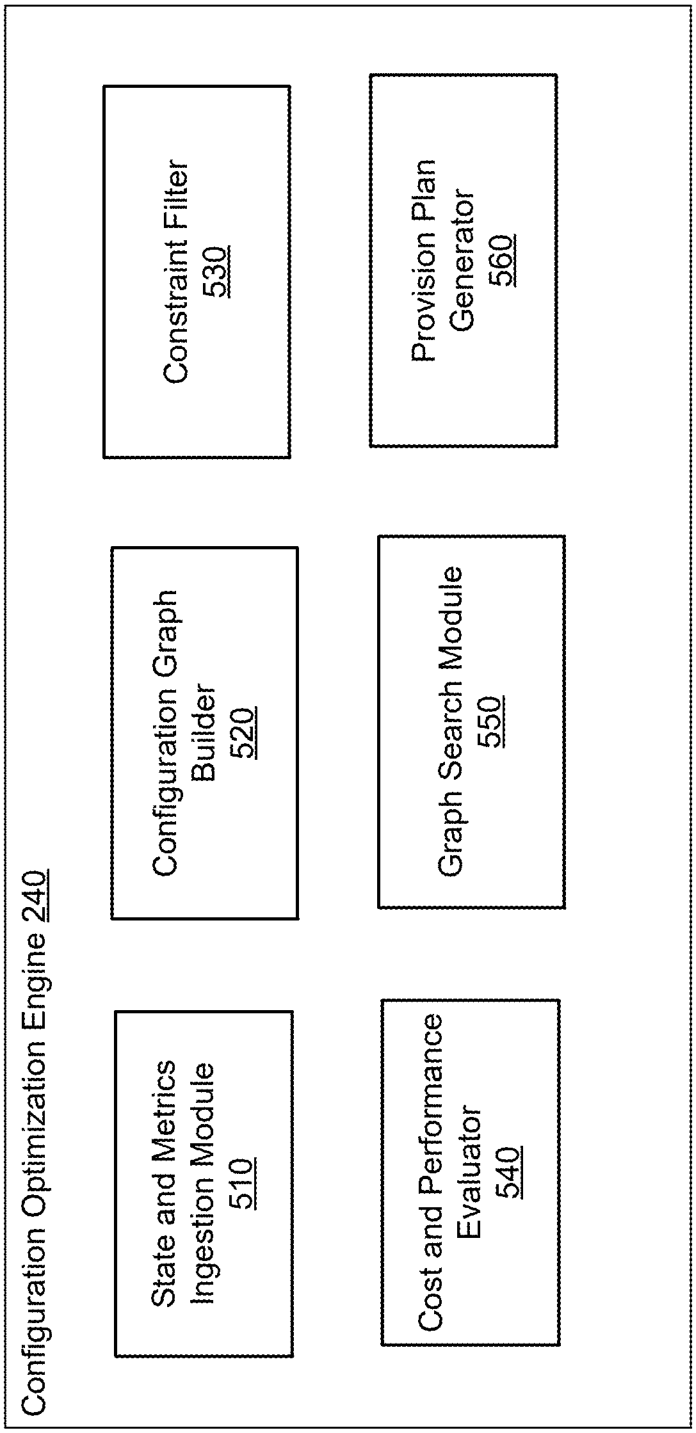
FIG. 5 illustrates an example architecture of configuration optimization engine, in accordance with one or more embodiments.

FIG. 5 illustrates an example architecture of configuration optimization engine, in accordance with one or more embodiments. The configuration optimization engine 240 includes the state and metrics ingestion module 510, the configuration graph builder 520, the constraint filter 530, the cost and performance evaluator 540, the graph search module 550, and the provisioning plan generator 560. The state and metrics ingestion module 510 collects real-time node storage state and operational metrics from the system, providing a current context for optimization. The configuration graph builder 520 generates a graph representation of all feasible storage configurations and their possible transitions based on available hardware and cloud provider options. The constraint filter 530 removes graph nodes and edges that violate hard or soft constraints such as cloud service provider limits, modification lockout periods, or policy rules. The cost and performance evaluator 540 scores each feasible configuration based on factors such as capacity, IOPS, throughput, and monetary cost, enabling comparative analysis. The graph search module 550 traverses the filtered configuration graph to identify the optimal configuration that meets all requirements at the lowest cost. The provisioning plan generator 560 converts the selected configuration path into an executable plan, detailing the cloud API calls and filesystem commands required to implement the chosen storage modification. In some embodiments, there may be additional or fewer modules than those illustrated in FIG. 5. Additionally, the functionalities of these modules may be redistributed, multiple modules may be combined into a single module, and/or a single module's functionalities may be divided into multiple modules. The details of individual modules are described as follows.

The state and metrics ingestion module 510 collects comprehensive, real time state information and operational telemetry from the node storage controller to provide the configuration optimization engine with an accurate and current view of the system. The state and metrics ingestion module 510 gathers parameters such as the count of currently attached disks, their sizes, types, provisioned IOPS, throughput, and measured utilization. The state and metrics ingestion module 510 also captures dynamic performance data including read and write rates, as well as the history of any storage modifications. The state and metrics ingestion module 510 further incorporates active cloud service provider constraints, such as modification cooldown timings and maximum volume attachment limits. In one embodiment, the state and metrics ingestion module 510 subscribes to a secure metrics feed from node agents. In another embodiment, it polls cloud APIs, queries internal configuration databases, or integrates with external monitoring systems to supplement or validate telemetry. The state and metrics ingestion module 510 outputs a structured dataset for downstream modules, ensuring that optimization decisions are based on the most relevant state and constraint information.

The configuration graph builder 520 constructs a graph data structure that models the spectrum of viable storage configurations available for a worker node given its current state and provider capabilities. The configuration graph builder 520 constructs a structured representation of all feasible storage configurations for a worker node, forming the foundation for optimization and selection of the most suitable provisioning path. The configuration graph builder 520 translates the current node state and operational context into a graph data structure, where each node represents a valid target storage configuration defined by attributes such as disk count, disk size, disk type, provisioned IOPS, provisioned throughput, and performance layout (e.g., RAID0 striping). Each edge in the graph corresponds to a valid provisioning action that transforms one configuration into another, such as resizing an existing disk, attaching an additional disk, detaching a disk, replacing a device with one of a different type, or modifying performance parameters. Each node in this graph corresponds to a feasible configuration, defined by factors such as disk count, sizes, types, provisioned IOPS and throughput, and any RAID or striping schemes. Each edge represents a permissible provisioning action, such as resizing an existing volume, attaching or detaching a device, changing disk type, or tuning IOPS/throughput. In one embodiment, the module generates the entire solution graph in memory at the outset; in another, it uses lazy construction, building only relevant subgraphs just in time during search to reduce computational overhead. In one embodiment, the configuration graph builder 520 constructs the entire graph in real time by combining live telemetry data from the state and metrics ingestion module 510 with a catalog of allowable cloud configurations sourced from provider APIs or internal cost/specification databases. This complete graph allows exhaustive search across all possible configuration paths but may incur higher computation overhead in environments with large solution spaces. In another embodiment, the module employs lazy graph construction, generating only those branches relevant to the current optimization goal during traversal by the graph search module 550. This approach reduces memory usage and processing time, making it more efficient in dynamic or constrained environments.

The constraint filter 530 processes the configuration graph to filter out nodes and edges that do not meet operational or policy requirements before search execution. It enforces hard constraints such as provider imposed maximum volume counts per instance, attachment slot availability, disk type compatibility, required stripe or mirror set growth rules, and modification frequency quotas. It can also apply soft constraints stemming from operator preferences, redundancy or resilience targets, and cost avoidance strategies. In one embodiment, rules are encoded in a policy engine that is periodically updated with cloud provider capability changes.

In another embodiment, machine learning classification could be used to identify historically poor performing configurations and preemptively prune them. The output is a reduced search graph containing only viable configuration paths.

The constraint filter 530 validates the feasibility of configuration options in the optimization graph before search execution, ensuring that only permitted and practical nodes and edges remain for consideration. Its overall functionality is to apply both hard and soft constraints to the set of possible configurations generated by the configuration graph builder 520, pruning any that violate operational limits, provider rules, or policy requirements. Hard constraints typically encompass cloud service provider caps on the number of attachable volumes per instance type, supported disk type compatibility, rules for expanding striped sets (such as RAID0 stripe growth requirements), and modification frequency quotas that restrict how often a disk's parameters can be changed. Soft constraints may include operator-defined resilience objectives, preferred redundancy configurations, specific workload performance policies, or internal cost-avoidance measures. In one embodiment, the constraint filter 530 is implemented as a rule-driven validation engine. Rules are stored in a configuration repository and periodically updated to reflect changes in cloud provider capabilities and instance limits. This embodiment allows the filter to quickly apply declarative constraint definitions to the generated graph. In another embodiment, the module uses a constraints API to query real-time provider information, such as current attachable disk limits or permitted modification types, ensuring its validation reflects the latest environment state. For environments with complex policy layers, the constraint filter can also integrate with a policy management system to import and enforce organization-specific requirements. The constraint filter 530 interacts with the configuration graph builder 520 to receive the initial unfiltered graph of configurations, and passes the pruned graph to the cost and performance evaluator 540. The constraint filter 530 may also communicate with external sources, such as cloud provider services or internal resource catalogs, to obtain authoritative constraints data.

The cost and performance evaluator 540 assigns a composite score to each remaining configuration node to quantify suitability for both performance and cost objectives. The cost and performance evaluator 540 validates that capacity, IOPS, and throughput targets are met or exceeded, and then calculates cost metrics including recurring storage charges, provisioning costs, and potential cross zone transfer fees. According to an embodiment, the cost and performance evaluator 540 retrieves live pricing data from CSP APIs. Alternatively, the cost and performance evaluator 540 uses pre-loaded pricing tables refreshed on a schedule. The evaluator may weight cost versus performance factors according to configurable optimization modes, such as prioritizing minimal expense, highest performance, or an operator defined balance. These scores are passed to the graph search module 550 to guide path selection toward optimal outcomes.

The graph search module 550 performs a real-time traversal of the filtered configuration graph to identify the optimal storage configuration change path for a node. The graph search module 550 analyzes the set of feasible configurations, already generated and constraint-filtered by preceding modules and determines how to transition from the node's current storage setup to a target configuration in the most cost-efficient manner, while meeting all capacity, IOPS, throughput, and policy requirements. According to an embodiment, the graph search module 550 employs a greedy search algorithm that selects the lowest incremental cost move at each decision point, ensuring fast convergence suitable for online execution where scaling decisions must be made within seconds. One possible implementation maintains the configuration graph as an in-memory data structure with nodes annotated with performance and cost scores from the cost and performance evaluator 540, and edges annotated with required actions and associated constraints from the constraint filter 530. The graph search module 550 begins traversal at the node representing the current configuration, evaluates all directly reachable neighboring nodes, and advances along the edge leading to the option with the best cost-to-requirement satisfaction ratio. This process repeats iteratively until the search reaches a configuration node that satisfies all target criteria established by the configuration optimization engine 240. The greedy approach minimizes search overhead, making it appropriate for scenarios where the configuration space is large but decision speed is critical. The graph search module 550 interacts with the provisioning plan generator 560, passing the selected path through the configuration graph so that it can be translated into an executable sequence of provisioning and filesystem integration actions. In some embodiments, the graph search module 550 queries external data sources such as real-time cloud service provider pricing APIs or internal cost databases during traversal to refine cost estimates mid-search.

The provisioning plan generator 560 converts the optimal path output from the search into a concrete, ordered provisioning plan ready for execution. The provisioning plan specifies each call to cloud service provider APIs to add, resize, detach, or modify volumes, along with any adjustments to IOPS or throughput settings. The provisioning plan generator 560 transforms the selected optimal target storage configuration into a fully actionable sequence of provisioning and integration operations that can be executed reliably in a live environment. The provisioning plan generator 560 bridges the decision-making process of the configuration optimization engine with the actual execution handled by lower-level orchestration and filesystem management components. The provisioning plan generator 560 takes the path determined by the graph search module 550, representing the transitions from the current node configuration to the target configuration and decomposes it into discrete steps, each specifying the exact actions required at both the cloud provider API level and the operating system/filesystem level. In one embodiment, the provisioning plan generator 560 compiles a chronological list of API operations such as adding new block devices, resizing existing volumes, modifying IOPS or throughput parameters, or detaching obsolete devices. The provisioning plan generator 560 associates each API operation with the corresponding operating system or filesystem command sequence needed to integrate the change online. For example, in an LVM-based environment, operations might include pvcreate to initialize a new device as a physical volume, vgextend to add the device to a volume group, lvextend to expand the logical volume, and resize2fs or xfs_growfs to update the filesystem. In BTRFS environments, actions might involve btrfs device add to include a new device, triggering an online rebalance, or btrfs device delete to remove a device while redistributing data automatically. The provisioning plan generator 560 may generate provisioning plans that include verification checkpoints after critical steps, confirming that devices are recognized by the operating system, that volume groups reflect the expected capacity, and that performance parameters match the targeted values.

Process of Storage Configuration Optimization

Figure 6:
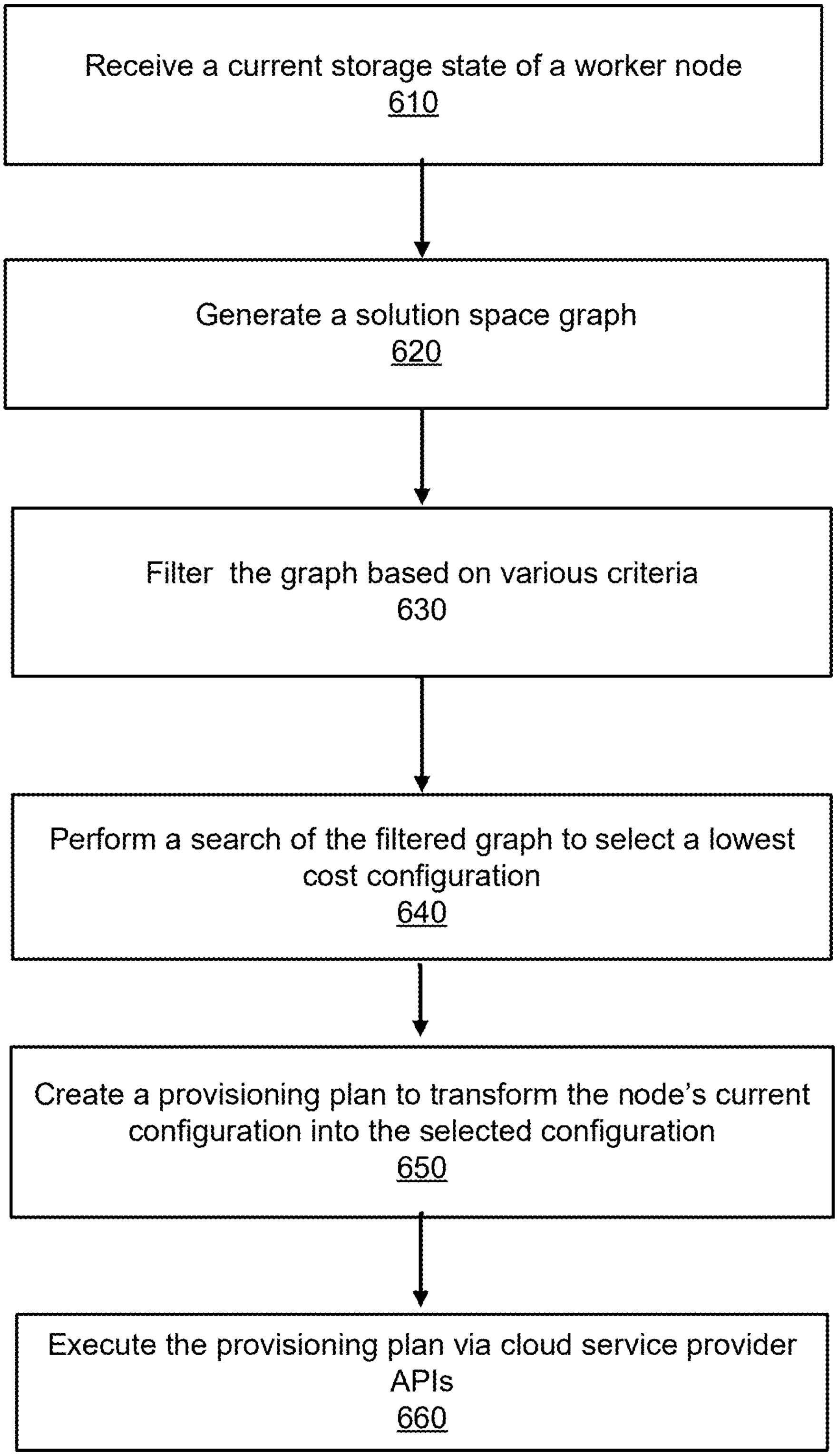
FIG. 6 is a flowchart of a method for storage configuration optimization for worker nodes, in accordance with one or more embodiments.

FIG. 6 is a flowchart of a method 600 for storage configuration optimization for worker nodes, in accordance with one or more embodiments. In various embodiments, the method includes different or additional steps than those described in conjunction with FIG. 6. Further, in some embodiments, the steps of the method may be performed in different orders than the order described in conjunction with FIG. 6. The method described in conjunction with FIG. 6 may be carried out by the automation system 110 in various embodiments, while in other embodiments, the steps of the method are performed by any online system capable of performing these steps.

The state and metrics ingestion module 510 receives 610, from a node agent running on the worker node, the current storage state including, but not limited to, total and available disk capacity, disk type for each attached volume, the number of attached disks, provisioned input/output operations per second (IOPS) and throughput for each device, and timestamps of the last performed modifications. This reception may occur via a secure telemetry channel over the container orchestration network, using push-based streaming from the node agent or pull-based polling initiated by the ingestion service. In some embodiments, the module also collects operating system-level identifiers for each device to maintain mapping consistency; in alternative embodiments, supplemental or corroborating information is retrieved directly from cloud service provider APIs to ensure the reported state matches the authoritative provider configuration. In some embodiments, receiving the current storage state also involves historical usage metrics for that node, and the search process uses predictive analytics to anticipate future storage needs. This can be implemented using statistical trend analysis or machine learning-based forecasting.

The configuration graph builder 520 generates 620 a solution space graph, where each vertex represents a complete and feasible storage configuration for the node, defined by a set of parameters including disk count, individual and aggregate capacities, disk types, IOPS, throughput, and possible RAID or striping arrangements. Each edge in the graph corresponds to a valid provisioning action, such as resizing an existing disk, attaching or detaching specific disks, or changing provisioned performance characteristics. In one embodiment, the entire configuration graph is built eagerly using a known set of underlying hardware and provider options; in another embodiment, the graph is built lazily, generating branches only when needed by the search algorithm in later steps, thereby reducing computational and memory overhead for large solution spaces. In some embodiments, generating the solution space graph involves creating vertices to represent configurations with different numbers of storage devices, device types (e.g., SSD vs HDD, gp3 vs io2), and RAID or striping arrangements that influence capacity and throughput. This enables the graph to capture the full configuration space available to the system. Implementation may query provider-specific catalogs to define legal combinations, while alternative embodiments can incorporate hypothetical or planned hardware for forecasting. In some embodiments, the configuration graph builder 520 filters out vertices and edges from the solution space graph if they violate hard constraints such as maximum attachable device limits, disallowed disk types, modification frequency quotas, or redundancy requirements. This prunes infeasible paths before search execution.

The constraint filter 530 filters 630 the generated solution space graph according to multiple categories of constraints. The filter applies minimum required capacity and minimum IOPS/throughput thresholds based on workload or policy requirements. It also enforces hard cloud-provider limits on the maximum number of attachable disks per instance type, as well as modification cooldown restrictions, such as time-limited prohibitions on resizing a volume after a previous modification. In a preferred embodiment, the constraint filter queries an up-to-date internal constraints database built from provider documentation and prior API calls; in alternative embodiments, operator-defined "soft" constraints such as redundancy policies, cost ceilings, or preferred device types are also applied. Nodes and edges that fail these checks are pruned from the graph to simplify subsequent search.

The graph search module 550 performs 640 a search of the filtered graph to select the lowest-cost configuration that meets all applied constraints. In one embodiment, a greedy search algorithm is used to iteratively choose the next best edge leading toward a feasible solution, minimizing cost at each step. In other embodiments, alternative graph traversal and optimization techniques such as A* search, Dijkstra's algorithm, or beam search may be used to find global optima or to explore multiple promising candidate paths in parallel. Cost calculations during the search may incorporate not only cloud pricing for storage devices, but also predicted operational impacts, such as added latency from striping or expected resilience changes. In some embodiments, the search process applies algorithms such as A* search, Dijkstra's algorithm, or beam search to explore optimal configuration paths. This allows flexible trade-offs between computational complexity and solution quality. For example, A* can incorporate heuristics for cost prediction; Dijkstra's can ensure exact shortest-path results; and beam search can limit search breadth for large graphs. In some embodiments, search traversal dynamically updates the solution space graph when new telemetry, updated provider limits, or pricing changes occur, ensuring decisions reflect the latest environment state. In some embodiments, the search algorithm maintains a ranked list of candidate paths, evaluating each for constraint compliance and weighted score before committing to further expansion. This enables robust comparisons across multiple potential solutions. In some embodiments, edge weights are recalculated during search in response to resource availability changes, revised provisioning timelines, or modified costs, allowing the algorithm to adapt mid-execution.

The provisioning plan generator 560 generates 650 an action plan to transform the node's current configuration into the selected optimal configuration. The action plan specifies a concrete, ordered sequence of provisioning operations to execute, which may include: modifying the capacity of one or more existing disks; attaching new disks of calculated size, type, IOPS, and throughput; detaching unneeded disks; and/or adjusting provisioned performance parameters for existing devices. In some embodiments, the plan includes decision points for conditional execution, such as choosing between resizing or attaching based on success or failure of API calls; in others, the plan incorporates verification and rollback steps to ensure reliability in live production environments. In some embodiments, generating the provisioning plan comprises deciding whether to resize an existing storage device or attach a new one by checking provider-imposed modification lockout periods. If the current device is within its cooldown window, the system opts for attaching new devices; otherwise, it may choose resizing for efficiency. Implementation details include tracking last modification timestamps per volume and comparing against provider limits. In some embodiments, generating the provisioning plan includes mapping the chosen path from the dynamically updated solution space graph into explicit cloud API calls and corresponding filesystem operations, ensuring the physical implementation matches the optimized configuration plan.

The provisioning orchestration module 250 executes 660 the action plan by invoking the appropriate cloud service provider APIs to create, modify, attach, detach, or delete block devices, and by issuing the necessary operating system commands to integrate these devices into the live node without downtime. Filesystem and logical volume operations, coordinated through the filesystem management module 260, may include commands such as pvcreate, vgextend, lvextend, and resize2fs for LVM configurations, or btrfs device add and btrfs balance for BTRFS configurations. In one embodiment, execution is transactionally monitored, so that a failure in any step triggers compensating operations to revert to a stable prior state; in another, the system uses asynchronous orchestration to parallelize non-dependent actions, reducing the total reconfiguration time while maintaining node uptime and workload continuity. In some embodiments, executing the provisioning plan involves filesystem management routines on the worker node, such as adding a device to a logical volume group, extending the logical volume, and resizing the filesystem online without unmounting it. This maintains workload availability while capacity is changed. In some embodiments, executing the provisioning plan includes adding a device to a filesystem array, performing an online rebalance to redistribute data, and making additional capacity immediately available without unmounting.

Alternative Embodiments for Graph-Based Storage Configuration Optimization

In some embodiments, the solution space graph is enriched by annotating each vertex with storage performance parameters, such as provisioned input/output operations per second (IOPS) and provisioned throughput. This allows the optimization engine to evaluate configurations not only on capacity but also on their ability to meet workload performance requirements. Implementation can include pulling these metrics from current device characteristics, cloud provider APIs, or historical performance baselines. In alternative embodiments, vertices may also include latency figures, burst capacity, or quality-of-service indicators for more granular optimization.

In some embodiments, the search of the solution space graph uses a greedy search algorithm, incrementally selecting the next edge that provides the lowest incremental cost while meeting required capacity, IOPS, and throughput constraints. This approach allows for rapid convergence to a practical solution suitable for real-time scaling operations. An alternative embodiment may combine greedy search with lookahead heuristics to avoid local minima when cost and performance trade-offs are complex.

In some embodiments, the lowest-cost storage configuration is selected based on a composite score that weights monetary cost against performance metrics like throughput and IOPS in accordance with one or more scaling policies (e.g., aggressive, default, conservative). Implementation may define these weights in configuration files or adjust them dynamically based on workload type. In alternative embodiments, machine learning models may derive weighting strategies from historical performance data.

In some embodiments, the provisioning plan includes steps to adjust provisioned IOPS or throughput on existing devices in addition to capacity changes or device attachment/detachment. Implementation may leverage cloud APIs that allow tuning of performance parameters without data migration. Alternatively, the plan may combine adjustments with rebalancing to align performance with new capacity.

In some embodiments, the system validates completion by confirming that the operating system recognizes modified or newly attached devices and verifying that capacity and performance parameters match the intended target. Implementation can include running OS-level device enumeration, comparing reported metrics against configuration goals, and triggering remediation if discrepancies are found.

In some embodiments, real-time storage pricing data from cloud providers is obtained and incorporated into the selection process, enabling the optimization engine to choose configurations that reflect current market pricing. This can be implemented through periodic API calls to provider cost endpoints.

In some embodiments, edges in the solution space graph include provisioning actions that combine multiple devices into a RAID0 stripe set, meeting throughput and IOPS requirements at reduced cost. Implementation may model the aggregate performance benefits and failure tolerances of such sets.

In some embodiments, generating the solution space graph leverages real-time telemetry from nodes and active provider constraints to define vertices and edges dynamically at runtime. This prevents stale configurations from entering consideration. In some embodiments, generating the solution space graph includes pruning vertices and edges that fail hard constraints such as max volume limits, type incompatibility, stripe growth rules, or modification quotas before search execution. In some embodiments, pruning also removes vertices and edges that conflict with soft constraints, such as exceeding cost caps, violating resilience policies, or ignoring operator-defined preferences, allowing adherence to business rules.

In some embodiments, vertices are assigned weighted scores based on a composite of capacity, IOPS, throughput, and monetary cost. This enables the search process to balance performance against expense. In some embodiments, composite weighting factors are adaptively adjusted during search execution in response to historical patterns or incoming real-time metrics, improving decision accuracy under changing conditions.

Technical Improvements

The system as disclosed according to various embodiments provides technical improvements to computing systems in the context of Kubernetes and similar container orchestration platforms, addressing inefficiencies and operational constraints that are not solved by conventional resource scaling methods.

Systems according to various embodiment, provide automated, in-place reconfiguration of node-attached storage without node downtime. Through integration with multiple cloud provider APIs, operating system-level logical volume management (LVM) or BTRFS tooling, and an orchestration control system, the system can dynamically expand or contract the provisioned block storage capacity in response to observed usage and performance metrics. This automation incorporates fine-grained adaptive thresholds tied to both storage utilization and provisioned IOPS/throughput, ensuring scaling decisions are made before Kubernetes eviction logic is triggered while avoiding waste from premature expansions.

The system executes a real-time configuration optimization engine that models various disk layout options, including varying disk counts, capacities, types, and performance characteristics as a constraint-filtered graph, and applies a greedy search algorithm to select the lowest-cost configuration meeting capacity, throughput, and IOPS requirements. This computation accounts for live cluster state, provider-specific modification limits and attachment quotas, and current cloud pricing. By computing solutions on demand instead of relying on pre-computed tables, the system responds accurately to diverse and changing infrastructure states.

The disclosed system implements a closed-loop feedback mechanism in which scaling actions are validated at the OS and filesystem level and verified to match target parameters before incorporating the new state into the telemetry pipeline. This ensures the management logic operates on accurate post-action data and can continuously tune policies, thereby overcoming drift and error conditions that would otherwise undermine resource optimization.

The techniques for autoscaling of node storage disclosed yield measurable performance benefits including following (1) Prevention of disk pressure evictions in Kubernetes by acting before thresholds are reached, preserving in-progress computations and avoiding workload restarts; (2) Cost reduction via dynamic right-sizing (under-provisioning initially, then scaling only as required) and optimal disk composition selection; (3) Improved throughput and responsiveness by detecting and eliminating IOPS/throughput bottlenecks through automatic performance parameter tuning alongside capacity changes; and (4) Multi-provider operability through abstraction layers that reconcile disparate API semantics, limits, and timing rules. For example, data from production cluster was measured to shows that node disks are underutilized with an average utilization across all nodes of around 10%, while the 85th percentile of utilization was only 30%. Furthermore, node disks were observed to be significantly overprovisioned with 50% of instances using no more than ~10-11% of provisioned storage, and 85% of instances using less than 30% or provisioned storage. The techniques disclosed address these inefficiencies by monitoring disk actual usage and right-sizing the node root disk by dynamically expanding, or shrinking, the provisioned storage based on usage, preventing disk pressure when demand on some instances spikes. Therefore, the techniques for autoscaling of node storage disclosed improve the efficiency of storge resources of a computing system by effectively utilizing the storage available and minimizing wasted disks.

The techniques for autoscaling of node storage enhance the functioning of the computer system itself, enabling container nodes to reconfigure their own storage at runtime, thereby improving how container orchestration platforms such as Kubernetes utilize hardware resources by integrating live filesystem management, predictive analytics, and optimization techniques into the orchestration layer.

The storage configuration optimization offers specific technical improvements to the functioning of computer systems and container orchestration environments by introducing an automated, intelligent method for real-time storage configuration optimization at the node level that was not previously feasible using conventional tools.

The storage configuration optimization overcomes the traditional immutability of node storage configurations in Kubernetes by enabling in-place, online modification of node-attached storage capacity, type, and performance parameters without node restarts or workload disruption. This is achieved through seamless orchestration between a node-resident controller, filesystem management layers (e.g., LVM or BTRFS), and cloud service provider (CSP) APIs to integrate new or resized block devices directly into active filesystems.

The storage configuration optimization introduces a solution space graph model that dynamically represents all feasible storage configurations for a node, with vertices encoding capacity, disk type, IOPS, throughput, and layout, and edges representing valid provisioning actions. This graph is constructed and filtered in real time using current node telemetry and CSP-specific constraints (including modification cooldown windows, attachment limits, and cost data). It is then traversed using optimized search algorithms (e.g., greedy, A*, or beam search) to select the lowest-cost configuration that still satisfies strict capacity and performance requirements. This real-time, constraint-aware graph traversal is a significant improvement over static, manual decision rules, enabling adaptive responses to unpredictable workload demands and cloud environment limitations.

The storage configuration optimization employs adaptive scaling thresholds and policy logic, optionally augmented by machine learning to determine not only when to scale, but also by how much based on disk size, provisioned performance parameters, historical usage, and workload write rates. This preemptive scaling avoids Kubernetes eviction events, improving workload stability without resorting to permanent over-provisioning.

The coordinated architecture for storage configuration optimization from the metrics collection and usage analysis modules, through the constraint-aware configuration optimization engine, to the provisioning orchestration and filesystem integration modules provides an end-to-end automated pipeline that executes complex, multi-layer disk configuration changes accurately and within CSP operational boundaries. This tight integration across multiple abstraction layers (Kubernetes scheduling, OS-level storage management, and CSP infrastructure) results in measurable technical benefits: higher resource utilization, lower storage costs through right-sizing and optimal device composition (including RAID0 configurations), and improved I/O performance without downtime.

Example Computing System

Figure 7:
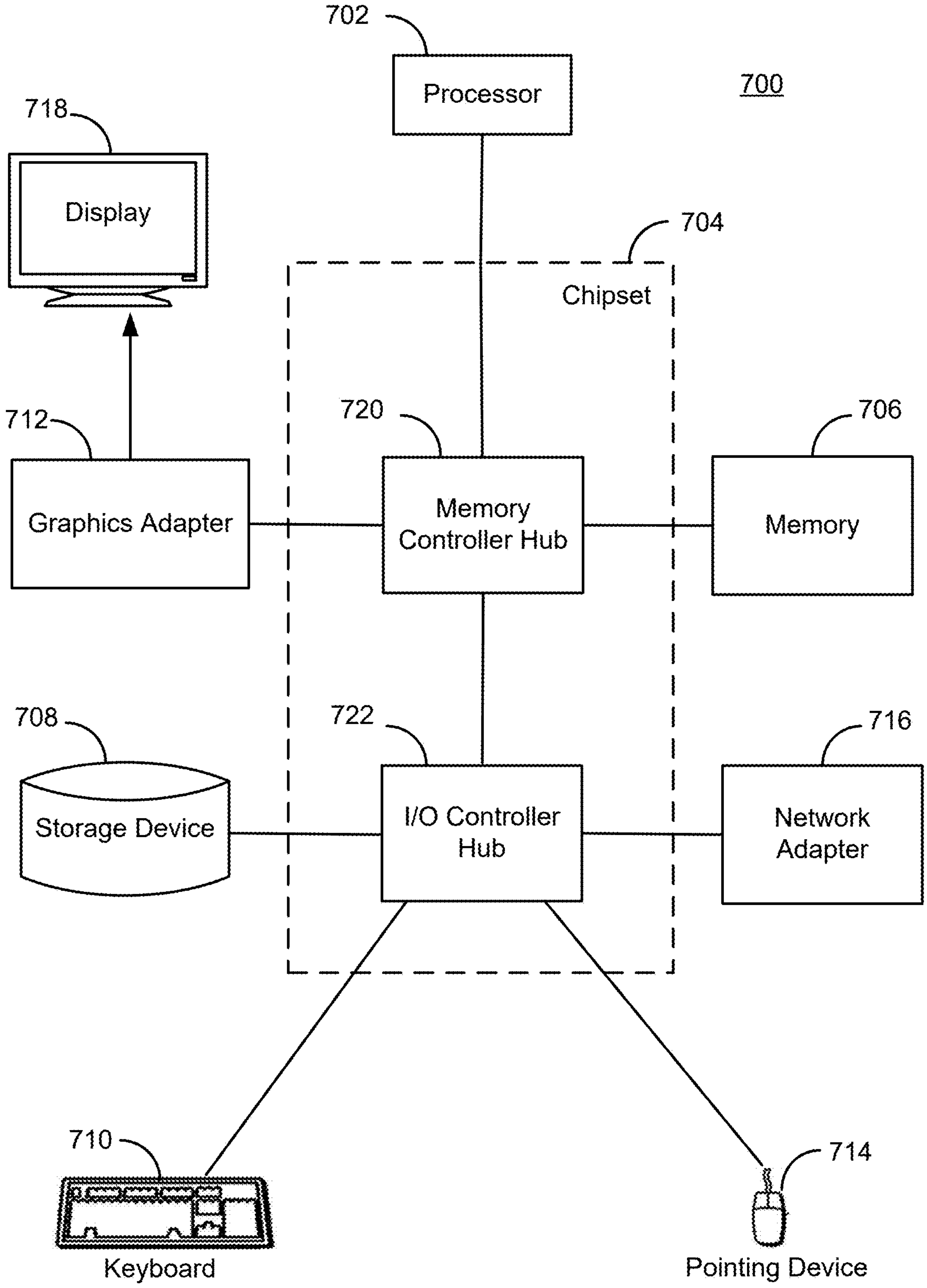
FIG. 7 is a block diagram of an example computer suitable for use in a networked computing environment, in accordance with one or more embodiments.

FIG. 7 is a block diagram of an example computer 700 suitable for use in the networked computing environment 100 of FIG. 1. The computer 700 is a computer system and is configured to perform specific functions as described herein. For example, the specific functions corresponding to automation system 110 may be configured through the computer 700.

The example computer 700 includes a processor system having one or more processors 702 coupled to a chipset 704. The chipset 704 includes a memory controller hub 720 and an input/output (I/O) controller hub 722. A memory system having one or more memories 706 and a graphics adapter 712 are coupled to the memory controller hub 720, and a display 718 is coupled to the graphics adapter 712. A storage device 708, keyboard 710, pointing device 714, and network adapter 716 are coupled to the I/O controller hub 722. Other embodiments of the computer 700 have different architectures.

In the embodiment shown in FIG. 7, the storage device 708 is a non-transitory computer-readable storage medium such as a hard drive, compact disk read-only memory (CD-ROM), DVD, or a solid-state memory device. The memory 706 holds instructions and data used by the processor 702. The pointing device 714 is a mouse, track ball, touchscreen, or other types of a pointing device and may be used in combination with the keyboard 710 (which may be an on-screen keyboard) to input data into the computer 700. The graphics adapter 712 displays images and other information on the display 718. The network adapter 716 couples the computer 700 to one or more computer networks, such as network 150.

The types of computers used by the entities and the automation system 110 of FIGS. 1 through 6 can vary depending upon the embodiment and the processing power required by the enterprise. For example, the automation system 110 might include multiple blade servers working together to provide the functionality described. Furthermore, the computers can lack some of the components described above, such as keyboards 710, graphics adapters 712, and displays 718.

Additional Considerations

The disclosed embodiments provide technical effects that enhance workload placement efficiency, resource utilization, and autoscaling performance in a cloud computing environment. By periodically collecting snapshots of workload states and compute instance availability, the system ensures that placement decisions are based on real-time data rather than static heuristics. The dynamic determination of grouping and bin packing algorithms enables the system to adapt to changing workload patterns and infrastructure constraints, improving cluster efficiency while minimizing computational overhead. Furthermore, the hierarchical approach to snapshot collection, grouping, and bin packing determination ensures that the system prioritizes responsiveness without excessive processing resource consumption. By selecting the best-performing workload placement algorithm based on empirical performance metrics, the invention optimizes compute resource allocation, reduces node fragmentation, and lowers resource consumption. Additionally, by automating and continuously refining workload placement strategies, the system reduces manual intervention, leading to more scalable, reliable, and cost-effective cloud operations.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcodes, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer-readable storage medium, which includes any type of tangible media suitable for storing electronic instructions and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method for storage configuration optimization in a container orchestration platform, comprising:
- receiving a current storage state of a worker node, the current storage state comprising one or more of: storage capacity and throughput;
- generating a solution space graph wherein each vertex corresponds to a feasible storage configuration and each edge corresponds to one or more provisioning actions;
- performing a search of the solution space graph to select a target storage configuration, wherein performing the search comprises identifying a low-cost path from the worker node's current storage configuration to the target storage configuration;
- generating a provisioning plan to transform the worker node's current storage configuration into the selected storage configuration, the provisioning plan comprising at least one of:
  - modifying capacity of an existing storage device,
  - attaching one or more new storage devices, or
  - detaching one or more storage devices; and
- executing the provisioning plan via one or more cloud service provider APIs and operating system commands.

2. The computer-implemented method of claim 1, wherein the solution space graph further includes, for each vertex, storage performance parameters comprising at least one of: provisioned input/output operations per second (IOPS) and provisioned throughput.

3. The computer-implemented method of claim 1, wherein generating the solution space graph comprises constructing vertices for configurations involving differing numbers of storage devices, differing storage device types, and different RAID or striping arrangements.

4. The computer-implemented method of claim 1, wherein performing the search of the solution space graph comprises applying a greedy search algorithm that incrementally selects a next edge based on lowest incremental cost while satisfying capacity, IOPS, and throughput constraints.

5. The computer-implemented method of claim 1, wherein the lowest-cost storage configuration is selected based on a composite score that weights cost against performance requirements according to one or more scaling policies.

6. The computer-implemented method of claim 1, wherein the provisioning plan further comprises adjusting provisioned IOPS or throughput of one or more existing storage devices in addition to modifying capacity, attaching, or detaching storage devices.

7. The computer-implemented method of claim 1, wherein generating the provisioning plan comprises determining whether to resize an existing storage device or attach a new storage device based on whether a provider-imposed modification lockout period has expired.

8. The computer-implemented method of claim 1, wherein executing the provisioning plan comprises, on the worker node, performing filesystem management operations including adding a new device to a logical volume group, extending a logical volume, and resizing a filesystem online without unmounting.

9. The computer-implemented method of claim 1, wherein executing the provisioning plan comprises, on the worker node, performing filesystem management operations including adding a device to a filesystem array, performing an online rebalance to redistribute data, and making additional capacity available without unmounting the filesystem.

10. The computer-implemented method of claim 1, wherein generating the solution space graph further comprises filtering out vertices and edges that violate one or more constraints selected from: cloud service provider attachment count limits, device type restrictions, modification frequency quotas, and redundancy policy requirements.

11. The computer-implemented method of claim 1, wherein receiving the current storage state further comprises receiving historical usage metrics for the worker node, and wherein the performing of the search uses predicted future requirements based on the historical usage metrics.

12. The computer-implemented method of claim 1, wherein generating the solution space graph comprises incorporating real-time node telemetry and active cloud service provider constraints to dynamically define vertices and edges at runtime.

13. The computer-implemented method of claim 1, wherein generating the solution space graph further comprises pruning vertices and edges that do not satisfy one or more hard constraints, including at least one of maximum attachable volume limits, disk type compatibility, stripe growth rules, or modification-frequency quotas.

14. The computer-implemented method of claim 1, wherein the search of the solution space graph is performed over a lazily constructed subgraph generated to include only vertices reachable under current operational constraints.

15. The computer-implemented method of claim 1, wherein performing the search comprises dynamically updating the solution space graph during traversal in response to new telemetry, updated cloud service provider limits, or pricing changes.

16. The computer-implemented method of claim 1, wherein performing a search comprises maintaining a ranked list of candidate paths such that each candidate is evaluated for constraint satisfaction and weighted score before proceeding to a next search step.

17. The computer-implemented method of claim 1, wherein the performing a search comprises recalculating edge weights in response to at least one of: changes in cloud resource availability, updated provisioning times, or modified cost structures.

18. The computer-implemented method of claim 1, wherein generating the provisioning plan comprises:

selecting a path from a current storage configuration of the worker node to the selected storage configuration; and mapping the selected path to a sequence of cloud API calls and corresponding filesystem operations.

19. A non-transitory computer readable storage medium having instructions encoded thereon that, when executed by one or more processors, cause the one or more processors to:

receive a current storage state of a worker node, the current storage state comprising one or more of: storage capacity and throughput;

generate a solution space graph wherein each vertex corresponds to a feasible storage configuration and each edge corresponds to one or more provisioning actions;

perform a search of the solution space graph to select a target storage configuration, wherein performing the search comprises identifying a low-cost path from the worker node's current storage configuration to the target storage configuration;

generate a provisioning plan to transform the worker node's current storage configuration into the selected storage configuration, the provisioning plan comprising at least one of:

modifying capacity of an existing storage device, attaching one or more new storage devices, or detaching one or more storage devices; and execute the provisioning plan via one or more cloud service provider APIs and operating system commands.

20. A system, comprising:

one or more processors; and a non-transitory computer readable storage medium having instructions encoded thereon that, when executed by the one or more processors, cause the one or more processors to:

receive a current storage state of a worker node, the current storage state comprising one or more of: storage capacity and throughput;

generate a solution space graph wherein each vertex corresponds to a feasible storage configuration and each edge corresponds to one or more provisioning actions;

perform a search of the solution space graph to select a target storage configuration, wherein performing the search comprises identifying a low-cost path from the worker node's current storage configuration to the target storage configuration;

generate a provisioning plan to transform the worker node's current storage configuration into the selected storage configuration, the provisioning plan comprising at least one of:

modifying capacity of an existing storage device, attaching one or more new storage devices, or
detaching one or more storage devices; and execute the provisioning plan via one or more cloud service provider APIs and operating system commands.

* * * * *